United States Patent [19]

Sheffield

[11] Patent Number: 5,752,018
[45] Date of Patent: May 12, 1998

US005752018A

[54] BUFFERED DATABASE TABLE INTERFACE OBJECT SYSTEM

[75] Inventor: Kim A. Sheffield, Groton, Mass.

[73] Assignee: Powersoft Corporation, Concord, Mass.

[21] Appl. No.: 652,731

[22] Filed: May 22, 1996

Related U.S. Application Data

[63] Continuation of Ser. No. 393,049, Feb. 23, 1995, Pat. No. 5,566,330, which is a continuation of Ser. No. 747,858, Aug. 20, 1991, abandoned.

[51] Int. Cl.$^6$ .................................................. G06F 17/30
[52] U.S. Cl. .................................................. 395/602
[58] Field of Search .................................................. 395/602

[56] References Cited

U.S. PATENT DOCUMENTS

| | | | |
|---|---|---|---|
| 5,121,477 | 6/1992 | Koopmans et al. | 395/156 |
| 5,148,154 | 9/1992 | MacKay et al. | 340/712 |
| 5,179,652 | 1/1993 | Rozmanith et al. | 395/155 |
| 5,204,947 | 4/1993 | Bernstein et al. | 395/157 |
| 5,293,615 | 3/1994 | Amada | 395/600 |
| 5,566,330 | 10/1996 | Sheffield | 395/600 |
| 5,594,899 | 1/1997 | Knudsen et al. | 395/602 |

OTHER PUBLICATIONS

"How to Use Goldengate®, User's Guide", vol. 1–2, table of contents, §§1, 7, 17 (pp. 1–4, 13–14,41–53,58–73), 18 (pp. 1–3,6,26–32,37–44), 19 (pp. 1–5,19–20,22–23), 1987 Cullinet PC Software, Inc., Westwood, MA.
NeXT Computer, Inc. brochure (May 1991).
NeXT Computer, Inc., NeXT on Campus brochure, p. 19 (Jan. 1991).
NeXT Computer, Inc., Software and Peripherals brochure, pp. 7–8, (Mar. 1991).
NeXT Computer, Inc., Spring 1991 List Prices brochure (Apr. 1991).
Gupta Technologies Inc., SQLWindows Technical Reference Manual, Chapter 3.
NeXT Computer, Inc., The NeXTstep User Interface brochure (1990).
Czejdo et al., "Integration of Database Systems and Smalltalk", Symposium on Applied Computing, 3–5 Apr. 1991, pp. 393–402.
Theimer et al., "QuickSilver Support for Access to Data to Large, Geographically Dispersed Systems", 9th Int'l Conference on Distributed Computing, 5–9 Jun. 1989, pp. 28–35.
Theimer et al, "QuickSilver Support for Access to Data in Large, Geopraphically Dispersed Systems", 9th Intl Conf on Distributed Computing, 5–9 Jun. 1989, p. 28–35.
Czjedo et al, "Integration of Database Systems and Smalltalk", Symposium on Applied Computing, 3–5 Apr. 1991, p. 393–402.

Primary Examiner—Wayne Amsbury
Attorney, Agent, or Firm—Fish & Richardson P.C.

[57] ABSTRACT

A program object providing an interface between a computer database manager and a client application program external to the interface object. The interface object includes associations between columns of the table and associated editing styles, a retrieve method, and an update method. Each editing style specifies a display format for data of the associated column. The column/style associations specify modifying methods for modifying data of respective columns of the table. The interface object is programmed to allow an applications programmer using the interface object to tailor the column/style associations to the database table without access to source code of the interface object. The retrieve method accepts an invocation message from the client program, and uses the column/style associations to issue commands to the database manager to retrieve data from the database into a buffer maintained by and within the interface object. The modifying methods accept directives to modify the retrieved data in the buffer and store a transcript of corresponding modification directives. The update method uses the column/style associations and the modification directives of the transcript to issue commands to the database manager to update the data of the database table in accordance with the modification directives.

7 Claims, 21 Drawing Sheets

FIG. 4

| Id | Manager | First Name | Last Name | Dept ID | Salary | Birth Date |
|---|---|---|---|---|---|---|
| 105 | 501 | Alan | Chamberlain | 100 | $27,900.00 | 12/04/60 |
| 247 | 501 | John | Spellman | 100 | $43,610.00 | 03/05/55 |
| 318 | 501 | Peter | Ciccone | 100 | $41,700.75 | 04/24/62 |
| 479 | 501 | Mary | Houston | 100 | $39,875.50 | 09/21/58 |
| 501 | 1293 | Linda | Watson | 100 | $56,700.00 | 03/01/51 |
| 657 | 902 | Ronald | Garcia | 200 | $39,800.00 | 01/23/63 |
| 703 | 902 | Michael | Stanley | 200 | $41,500.80 | 07/22/53 |
| 855 | 902 | Richard | McMahon | 200 | $24,892.00 | 04/07/59 |
| 902 | 1293 | Edward | Fitzgerald | 200 | $67,500.00 | 08/16/50 |
| 1090 | 501 | Susan | Smith | 100 | $51,411.00 | 11/30/63 |
| 1142 | 902 | Alice | Clark | 200 | $35,000.00 | 05/04/57 |
| 1293 | 0 | Howard | Barclay | 300 | $81,975.00 | 03/13/45 |
| 1336 | 902 | Janet | Bigelow | 300 | $31,200.00 | 07/21/55 |
| 1482 | 501 | Jack | Sussman | 300 | $75,400.00 | 04/27/46 |
| 1576 | 1293 | Thomas | Sinclair | 400 | $57,850.00 | 12/02/45 |

FIG. 5

BUFFERED DATABASE TABLE INTERFACE OBJECT SYSTEM

This is a continuation of application Ser. No. 08/393,049, now U.S. Pat. No. 5,566,330, filed Feb. 23, 1995, which is a continuation of application Ser. No. 07/747,858, filed Aug. 20, 1991.

REFERENCE TO APPENDICES

The application includes two appendices: (1) Appendix A entitled "Data Source Definition and Presentation Style Definition" and (2) a microfiche appendix pursuant to 37 CFR §1.96(b) containing 6 microfiche with 575 frames.

The invention is further described in published user documentation, namely *Using PowerBuilder* and *PowerBuilder Function Reference* (all ©1991 Powersoft Corporation), which are incorporated herein by reference.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The invention relates to a database interface, particularly to a graphical user interface (GUI) for applications development in a client/server environment.

A client/server environment is one in which an application program is split into two pieces. In an example database application, a "client" program provides the user interface, while a "server" program performs the complex or costly storage or computation management functions, for instance managing the disk location of database rows or applying a selection rule to select the relevant rows of the database.

In existing PC-based client/server application environments there are situations in which many, perhaps hundreds, of users having widely variant levels of database expertise execute sophisticated database queries frequently and regularly on a single, powerful relational database management system (RDBMS), e.g., SQL Server from Microsoft Corporation and SYBASE® Corporation, SQLBase® from Gupta Corporation, Inc., or ORACLE® server from Oracle Corporation. One example of such a situation is one in which a database is used to track information regarding a company's employees. Such a database is relied upon and used many times a day by management staff, accounting staff, and personnel staff for various purposes. Since the people actually using the database are not necessarily fluent in database languages or procedures, it is necessary to have an effective, i.e., easy to use, and efficient interface between the user and the database itself.

Typically, the interface between the user and the database is programmed in advance by a database programmer using an application development package having various database "tools", which range in sophistication from a programming language, e.g., C, to so-called "application builders" which provide software routines to automate some tasks, e.g., window managers to control data presentation effects such as "pop-up" windows, menu bars, and "pull down" menus. Such an interface typically employs graphics, color, and animation, all of which are CPU intensive functions executed by the front-end desktop computer.

SUMMARY OF THE INVENTION

The invention features a database interface and an interface customization tool. Both the interface itself and the customization tool may use graphical user interface (GUI) techniques. The interface provides applications having a unique object-oriented "DataWindow", i.e., a graphical user interface object (a program fragment that has certain well-defined "methods" that may be invoked by client programs) that has been customized to interact with a relational database.

The DataWindow approach has advantages for both the end user (for instance, a clerical worker, herein referred to as simply a "user") and the applications programmer (typically a member of the user's firm's Information Services department), though of course the applications programmer and user could be the same person.

Because the data window approach provides an applications programmer with a preselected palette of operations, and these operations behave consistently from instance to instance, the interface to the user is intuitive and consistent across multiple application programs. That is, as the programmer adjusts the underlying operation of the data window, the basic interaction methods for the user remain the same, thereby making the data window object simple to use.

Advantages to the applications programmer include the following. The applications programmer need not have extensive knowledge of database operations nor code database operations in a programming language such as C or a database language such as SQL in order to program a Data Window. That is, the interface includes objects, in particular the data window object, which are defined graphically, e.g., with a "data window painter" (described below), not by conventional program coding, and scripts which the applications programmer writes to direct the operations and actions of the data window object. All of the data window's behavior and interaction is encapsulated within the Data Window object, and thus the Data Window is portable. That is, it may be used as a module in numerous application programs without reprogramming. Because of the modular nature of the data window, more than one data window may be effectively and advantageously included in a single display.

An object, e.g., the DataWindow, operates in response to an "event" such as a mouse click, input from the keyboard, or events generated in related scripts, and then executes built-in methods to carry out one or more database operations. Such objects, which include other objects such as radio buttons and multi-line edit boxes, are "window class" application objects within the conventional meaning of object-oriented analysis and programming and within the known use of a windows presentation application, e.g., Microsoft Windows® 3.0. Thus, the window that contains one or more DataWindows can be available to the user for execution in any of a number of applications. Selecting the window, then, provides the user with a unique, programmable, database interaction object, i.e., the DataWindow, having a set of attributes, data and presentation definitions. In this way, the present invention effectively and efficiently unites an intuitive, programmable GUI (including the DataWindow) running on a client computer, e.g., a desktop workstation, with a previously installed relational database running on a host computer, e.g., a mainframe or server. Furthermore, not only is it possible through the present invention for a user to access several different RDBMS applications without having to be fluent in any of the particular languages, it is also possible for the applications programmer to link several database tables from a single RDBMS application together in one DataWindow. Another advantage of the present invention is the ability to reuse previously defined DataWindows in a number of windows and applications, thereby decreasing development and testing time requirements.

One aspect of the present invention features a system for defining a database interface that allows an applications programmer to graphically define, display, and use the data window to indirectly manipulate data in an application database. The applications programmer first defines a database selection, e.g., SQL Select statement, which specifies a number of column elements and one or more database tables contained in the application database. Each table contains a number of related rows, e.g., rows for all employees in a company, and each row contains a number of columns, e.g., name, department, and id number. As noted, the column elements represent the names of information columns in a relational table which contains the data to be manipulated by the user. Next, the database selection is executed against the application database to select and retrieve the desired data from tables in the application database.

Alternatively, instead of using an SQL Select statement to interact with a database, the applications programmer may choose to retrieve data from some other source, e.g., a spreadsheet, flat data file, process control device, etc. In this case, the data window is provided with its data via a script which retrieves the desired data from the non-database source. Once the data source is specified as a script source, a result set window appears in which the applications programmer can define the names of the columns to be retrieved, their data types, and their widths (if applicable). Regardless of the source of the data, the essential characteristics of the user's interaction with the data window remain the same.

After the data is retrieved from the database tables or some other source, each retrieved row is stored in one of a number of list structures contained in the interface, e.g., a display rows list and a delete rows list. The method then calls for generating a window display structure, herein referred to as the data window, as a part of the interface and displaying the data retrieved from the database tables in the data window. Once the data is on display, a user is allowed to make modifications to the data stored in the list structures, each of the modifications being immediately reflected in the list structures only, but not in the underlying application database or its tables. Finally, at the user's command or at the occurrence of some other predefined event, any modifications made by the user to the data in the list structures are applied in a batch update to the application database.

In preferred embodiments, the method further includes the step of setting a modified flag associated with each column element when it is modified in the list structures so that modified rows may be easily located. The same flags are cleared once the modifications have been applied to the application database. Furthermore, the data window contains conditional instructions which determine whether or not modifications may be applied to the database. For example, instructions applying modifications to the application database are executed if one table only is specified in the SQL Select statement described above and only if one of the column elements is a database key (i.e., an item of information which uniquely identifies the row, e.g., a social security number) for the specified table. Alternatively, the modifications may be applied to the application database if two or more tables are specified in the database selection, but only if the applications programmer specifies which table in the database may be updated by the data window and specifies a unique key for the specified table.

In a second aspect, the invention features a program object (a "DataWindow object") providing an interface between a computer database manager for managing a database table and a client application program external to the interface object. The interface object includes associations between columns of the table and associated editing styles, a retrieve method, and an update method. Each editing style specifies a display format for data of the associated column. The column/style associations specify modifying methods for modifying data of respective columns of the table. The interface object is programmed to allow an applications programmer using the interface object to tailor the column/style associations to the database table without access to source code of the interface object. The retrieve method accepts an invocation message from the client program, and uses the column/style associations to issue commands to the database manager to retrieve data from the database into a buffer maintained by and within the interface object. The modifying methods accept directives to modify the retrieved data in the buffer and store a transcript of corresponding modification directives. The update method uses the column/style associations and the modification directives of the transcript to issue commands to the database manager to update the data of the database table in accordance with the modification directives.

Preferred embodiments of this second aspect may include the following features. The interface object is programmed to display the retrieved data on a computer display. The modifying methods may accept commands from an interactive user, from a client program, or from both. The column/style associations specify whether or not retrieved data of the associated columns are to be displayed on a display screen. The interface object displays data both in built-in formats and in formats tailorable by the applications programmer. The column/style associations specify whether or not retrieved data of the associated columns are modifiable. A column/style association for a modifiable column includes an input validation criterion specified by the applications programmer. The interface object further provides sort methods, scroll methods, and filter methods to control the display of retrieved data. The interface object further provides export and import methods for copying data to destinations and from sources other than the database table. The interface object further includes insert and delete methods for adding and deleting rows from the buffer, which in turn will subsequently add or delete rows from the database table. The database interface object is an object; that is, it can be used by multiple disparate client programs, or multiple database interface objects can be used by a single client program. The database interface object accepts invocation of multiple ones of said modifying methods acting on the retrieved data. The update methods may then operate in either or both of two modes: a first mode in which the commands are issued sequentially to the database until all the modifications of the transcript are applied to the database or until one of the issued database commands fails, and a second mode in which the database commands are protected by a commit/rollback protocol to guarantee that all modifications of the transcript are applied to the database as a single unit of work, or that none are.

In a third aspect, the invention provides an interface program for providing a graphical user interface to a computer database manager. The interface program includes a graphic painter and a graphical user interface component that presents the interface composed in the graphic painter to a user of the interface. The interface uses extended column definitions of display characteristics for data of corresponding columns of the table beyond those characteristics inherent in a data dictionary of the database table.

5

Preferred embodiments of this third aspect may include the following features. The extended column definitions include a label for labelling the display of data of a column of the database, the label being different than the column name maintained by the database manager. The extended column definitions allow tailoring of text justification, screen position, and display size of displayed columns. The extended column definitions include a validation rule for verifying data entered by the user.

Other features and advantages will become apparent from an examination of the detailed description below and from the claims.

DESCRIPTION

Referring briefly to the drawings:

FIG. 4 is a screen display illustrating the generation of a script source definition.

FIG. 5 is a DataWindow containing rows retrieved from an application database table.

FIGS. 9–36 are screen displays.

The described functions and the DataWindow are embodied in software produced by Powersoft Corporation of Burlington, Mass. The software is named PowerBuilder™, and includes a portion devoted to the DataWindow. The PowerBuilder application runs on IBM® or compatible personal computers operating under MS-DOS® version 3.30 or higher and also running Microsoft Windows® version 3.0. The source code that embodies the DataWindow portion of PowerBuilder is attached hereto as an appendix and is also incorporated by reference. The programming language used is Microsoft C version 6.0.

Figure 8:
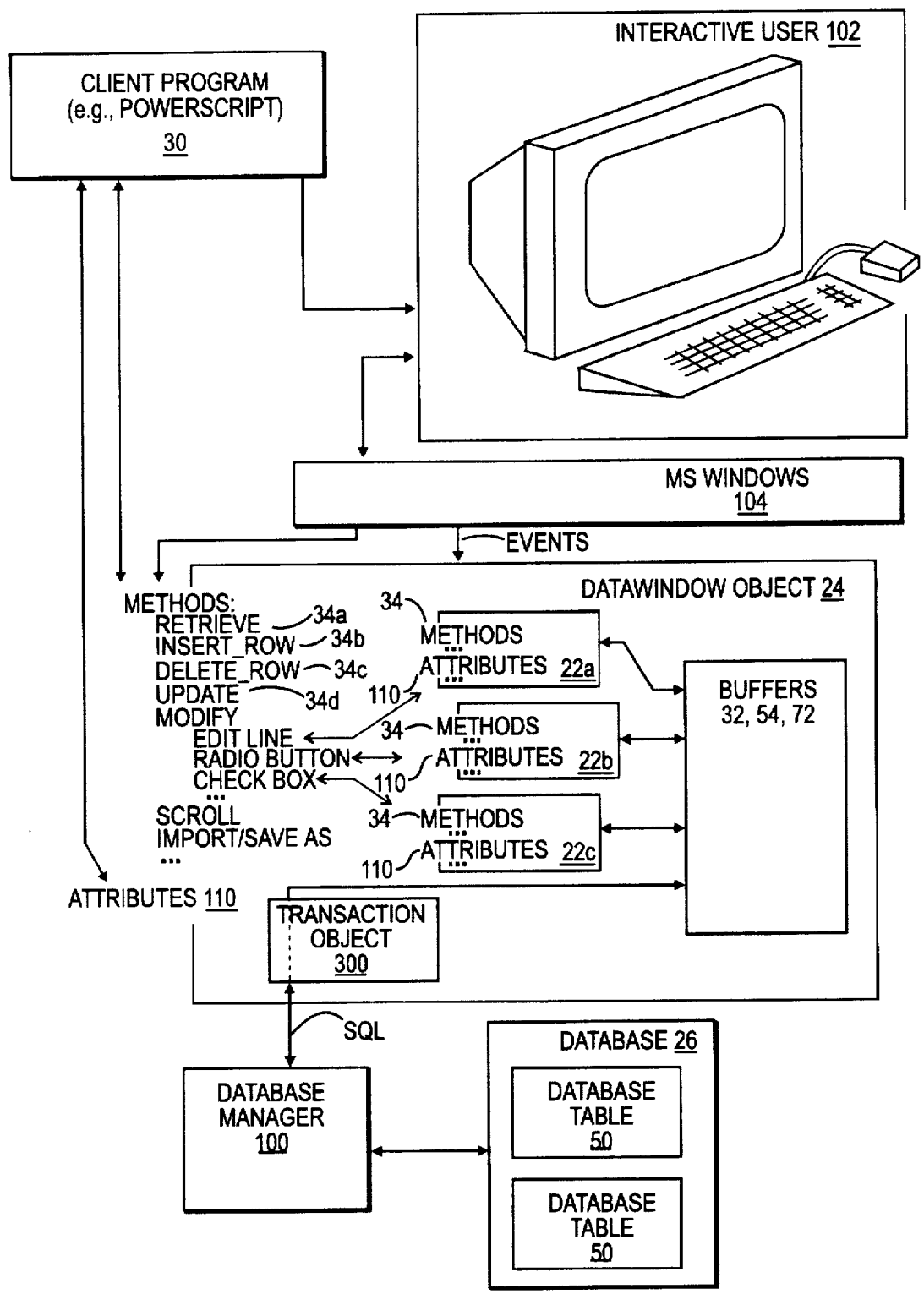
FIG. 8 is a block diagram of the database interface object and its relationship to a client program, an interactive user, and a database management system.

Referring to FIG. 8, the database interface object (named a DataWindow object) provides an interface to a database management system (DBMS) 100 which in turn provides an interface to a database 26 that resides on disk. (In this disclosure, the term "DataWindow" is used to refer to both the object itself, that is, the programmed methods, tailoring data, and data structures that provide an interface between a database manager and a client, and the display screen manifestation of that object with which a user interacts.) Database 50 has one or more tables 26. The clients of the DataWindow object 24 are either human interactive users 102 (interfaced to the DataWindow object 24 through Microsoft Windows 104) or client programs 30. The DataWindow object 24 is tailored to the database 26 itself and to the needs of the human 102 or program client 30 by an applications programmer who does not have access to the source code for PowerBuilder; the applications programmer tailors the DataWindow object by embedding window objects 22a–22n. within the DataWindow object 24. The client (either human or program) interacts with the DataWindow object 24, and thus the database 26, by calling the DataWindow object's and window objects' methods 34 and accessing the objects' attributes 110. The DataWindow object 24 in turn communicates to database 26 via a transaction object 300 which has been tailored to the database 26 by the applications programmer. The methods 34 and attributes 110 are the only interface to DataWindow object 24 that clients 102,30 are allowed to access; the internals of the DataWindow object 24 (for instance the buffers 32,54,72 and transaction object 300) cannot be directly accessed by the client. Thus, the methods 34 and attributes 110 are shown at the edge of the DataWindow object 24 in FIG. 8.

Figure 9:
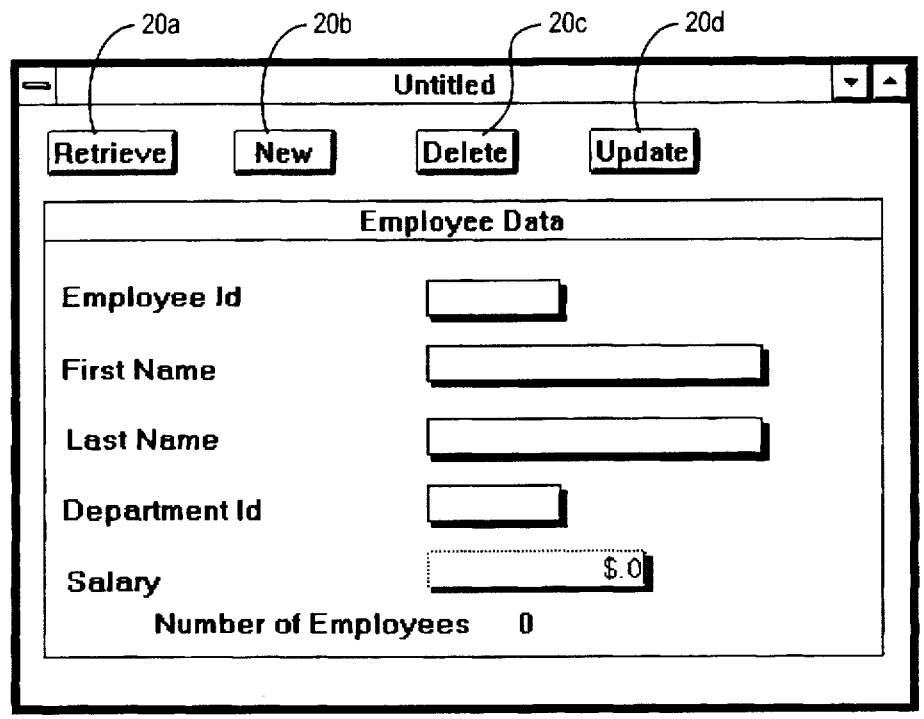
Figure 10:
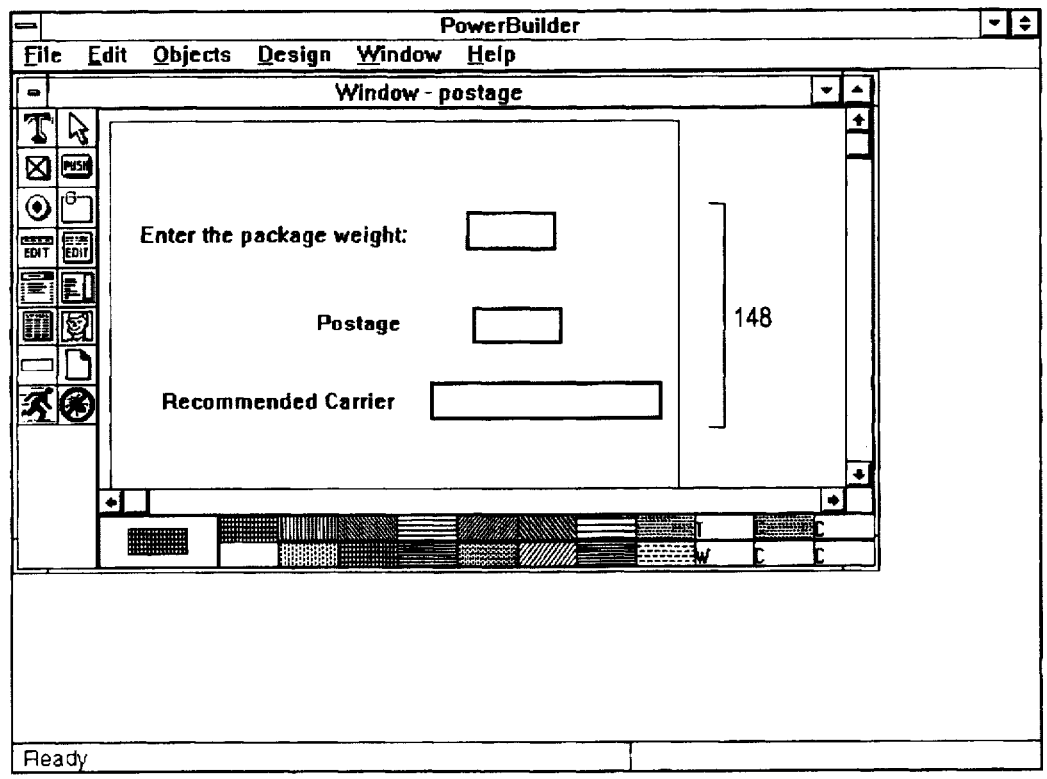

Referring to FIG. 9, a DataWindow 24 is an intelligent window object with specific knowledge about a portion of a database or another data source. The DataWindow 24 displays (presents) the data in a specific style (the presentation style). The applications programmer defines the source of the data and the presentation style to be used in the DataWindow using the DataWindow Painter. The DataWindow provides three aspects, and thus the methods 34 exposed by the DataWindow 24 to the clients fall into three categories.

The first aspect relates to the visual presentation of the DataWindow object. The visual presentation includes considerations as to how data appears in the DataWindow such as the measure of data units and whether a user may update it. Other visual presentation aspects include computations which may be performed on the data before it is displayed, e.g., whether the contents of a particular column of data are to be displayed in American dollars or English pounds or whether a date is to be shown in DD/MM/YY format or spelled out. Particular headings, fonts, and graphics are also a part of the visual presentation of the DataWindow.

A second aspect of the DataWindow relates to the input of data to the DataWindow 24, including validation rules and error checking. That is, the applications programmer can define particular requirements for the value of data in a column. For example, the data in a salary column can be required to have a value greater than 0, while a column relating to a choice between values can have one of a certain number of predefined values such as Y or N for "yes" or "no", M or F for "male" or "female" etc. In this way, the integrity of the underlying database or other data source can be protected from being updated with a user's invalid inputs.

Figure 1:
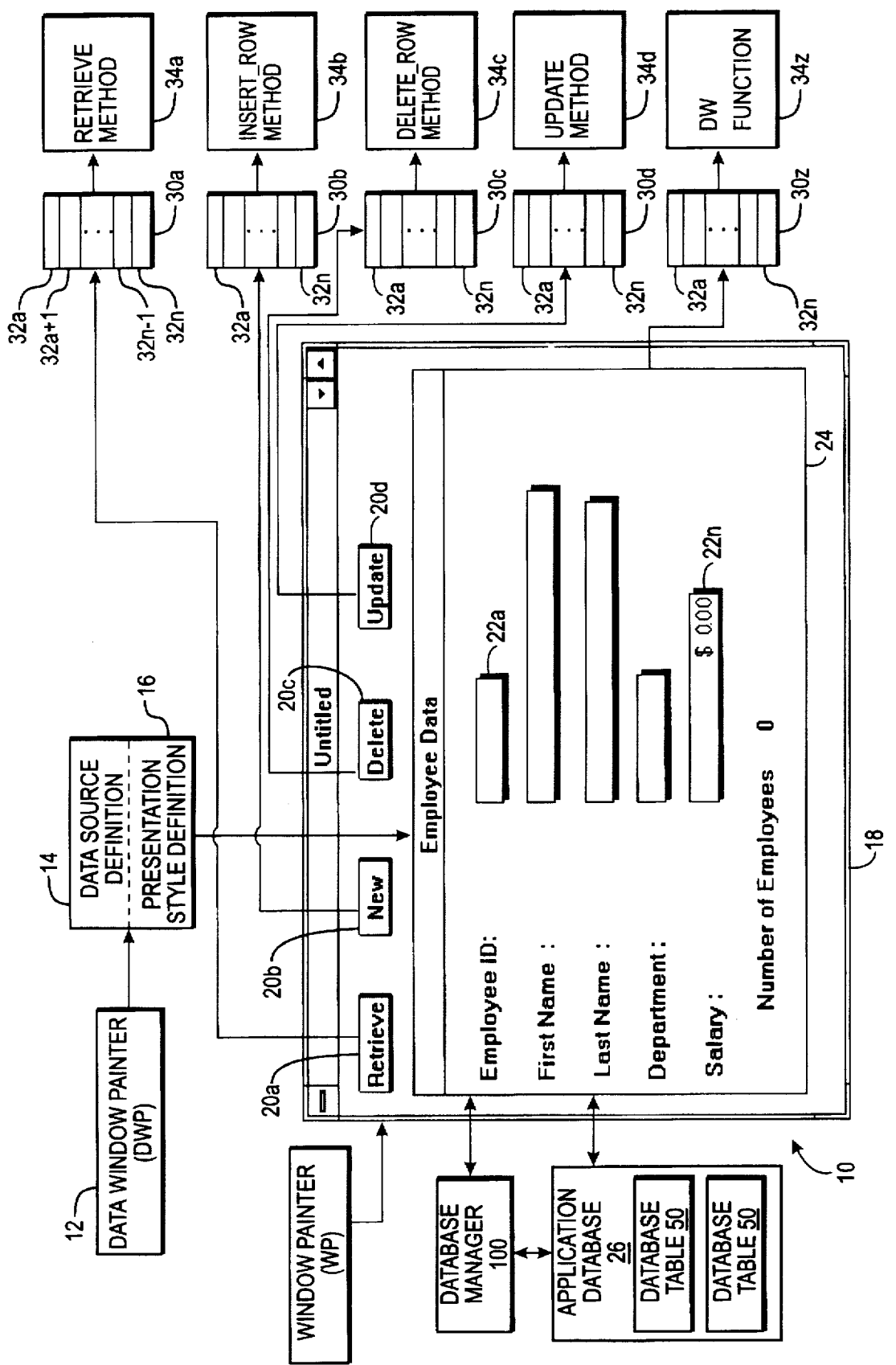
FIG. 1 is a block diagram of a database interface according to the present invention.

A third main aspect of the DataWindow 24 relates to the selection of data from the database. Referring to FIG. 1, a database interface 10 according to the present invention includes a DataWindow Painter 12 with which the applications programmer can create a data source definition 14 consisting of either a SQL Select statement (with or without arguments) or a script source statement, or a stored procedure. The DataWindow 24, defined by statements in the data source definition 14, is a graphic element and has several attributes, defined by statements in a presentation style definition 16, that control its initial appearance, e.g., whether it appears in a tabular or free form layout, when it is displayed on a computer monitor. (A sample data source definition and presentation style definition is provided in Appendix A.)

OVERVIEW OF POWERBUILDER

PowerBuilder is a graphic PC-based client/server application development environment. Using PowerBuilder, the applications programmer can develop object-based windows database applications without coding in C. PowerBuilder applications usually consist of one or more windows, which are used to communicate with the user. Each window is an object that contains other objects (called window objects).

Windows and window objects, which include CheckBoxes, DataWindows 24, RadioButtons, SingleLineEdits, Pictures, and other standard windows objects are used to communicate with the user and provide the user with information. By clicking an object or selecting an item from a list, a user can retrieve information from the database, update the database, initiate activities, and respond to requests from the application. The user can also enter and modify information in objects and print reports.

PowerBuilder objects have attributes and functions, and respond to events by running scripts. The attributes are properties of the object that a script can query or set to affect the behavior or appearance of the object. Scripts can call one of an object's functions to cause the object to "do something," for instance generate an event in a window, manipulate or change a window, or provide information about a window. Attributes of objects are identified using "dot" notation, for instance the "Checked" attribute of CheckBox object "cb" is referred to as "cb.Checked". An object's functions are called with parenthesis notation, for instance, a script calls the "Hide" function of CheckBox "cb" with "Hide(cb)". When an event is received by a window or object, an associated script is initiated that determines how the window or object behaves.

When a user selects an object with a mouse or enters or modifies information in an object with the keyboard, an "event" occurs. For example, when a user clicks a button, a Clicked event occurs. When the user modifies a line edit, a Modified event occurs. The event triggers a script to initiate processing in response to the event.

An object, e.g., the DataWindow 24, operates in response to "events" such as mouse clicks, input from the keyboard, or events generated in related scripts, and in response executes methods to carry out one or more database operations.

PowerBuilder scripts can assign values to the attributes of an object to change the appearance or behavior of the object and can test the values of the attributes to obtain information about the object. For example, a script activated when the user clicks a CommandButton could change the text displayed in a StaticText object, or another script can use the data entered in a SingleLineEdit to determine the information that is retrieved and displayed in a DataWindow.

Scripts are written in PowerScript, the PowerBuilder language. Scripts consist of PowerScript commands, functions, and statements that perform processing response to an event. For example, the script for a Clicked event might retrieve and display information from the application database, and the script for a Modified event might evaluate the data in a line edit and perform processing based on the data. Scripts can also trigger events. The script for a Clicked event might open another window which triggers an Open event.

PowerBuilder has several major components, each called a "painter." This disclosure discusses the following PowerBuilder painters:

the Application Painter, which the applications programmer uses to specify information about his application, such as its name and the PowerBuilder library search path in which the compiled application objects and scripts will be saved.

The Window Painter, which the applications programmer uses to build the windows and their objects that will be used in the application.

The Database Painter, in which the applications programmer defines and maintains databases, controls user access to the databases, and manipulates data in the database.

The DataWindow Painter, which the applications programmer uses to build intelligent objects called DataWindows 24 that have specific knowledge of a database or other data source. A DataWindow presents information from the data source in a specific style.

The Function Painter, in which the applications programmer builds functions, called scripts, to perform processing specific to the application.

OVERVIEW OF A POWERBUILDER APPLICATION

A PowerBuilder application is a collection of PowerBuilder objects that are used to perform related activities, such as human resources, order entry, or accounting. The Application object is the entry point into windows and objects that perform these activities. When an application is invoked for execution, an Open event occurs in the Application object. This event triggers the script that initiates all the activity in the application.

The first step in building a new PowerBuilder application is to create an Application object for the application. The applications programmer builds an Application object by specifying application-level scripts, assigning the application a name and icon, establishing the default text colors, sizes, styles and fonts for the application, and specifying the libraries the application can use, in the sequence in which they are to be searched at runtime.

When a user selects a PowerBuilder application, an Open event occurs in the Application object, which triggers the script for the Open event. Usually, this script opens the first window of the application. The applications programmer controls the activities that will take place in response to the Open event or any other event in the PowerScript Painter by building scripts for the events. Alternately, PowerBuilder applications that perform only batch processing perform their processing in the script for the Open event.

Table 1 lists the events that can occur in an Application object. The script for the Open event is the only script required for an application.

TABLE 1

| Event | Occurs when |
| --- | --- |
| Close | The user closes the application. |
| Idle | The idle function has been called and the specified number of seconds have elapsed with no mouse or keyboard activity. |
| Open | The user runs the application. |
| SystemError | A serious runtime error occurs (for example, trying to open a non-existent window). If there is no script for this event, PowerBuilder displays a message box with the PowerBuilder error number and the error message text. If there is a script, PowerBuilder executes the script. |

Application related functions are functions that cause an application-level event. Table 2 lists the application related functions.

TABLE 2

| Function | Use to |
| --- | --- |
| Idle | Start a timer that triggers an idle event after a period of user inactivity. The timer is reset after every user activity (a keystroke or a mouse move). |
| SignalError | Cause a SystemError event at the application level |
| TriggerEvent | Sends an event to an application object and executes the script associated with the event. |

Referring to FIG. 9, windows are the main interface between the user and PowerBuilder applications. Windows can display information, request information from a user, and respond to mouse or keyboard actions. The applications programmer builds windows in the Window Painter 20 by selecting options to define the appearance, style, type, size, and position of the window. He places PowerBuilder window objects (such as CheckBoxes, CommandButtons 20a–20d, or SingleLineEdits) in the window to request and receive information from the user and present information to the user. After placing an object in the window, the style of the object can be defined, and it can be moved and resized. The applications programmer can build scripts to control how the object responds to events.

Every window and window object has a style that determines how it looks to the user. The style is determined by values assigned to the attributes of the object. In the Window Painter, the applications programmer can specify the values of attributes by selecting style options that correspond to the attributes of a window or window object. Commands to set these values for a window are accessed by clicking items in menus presented by the Window Painter. The Window Painter maintains a window representation that shows how the window will display with the current settings.

The Database Painter allows the applications programmer to create, alter, and drop tables, create and drop views, create and drop indices, and define and modify table and view extended column information.

Figure 11:
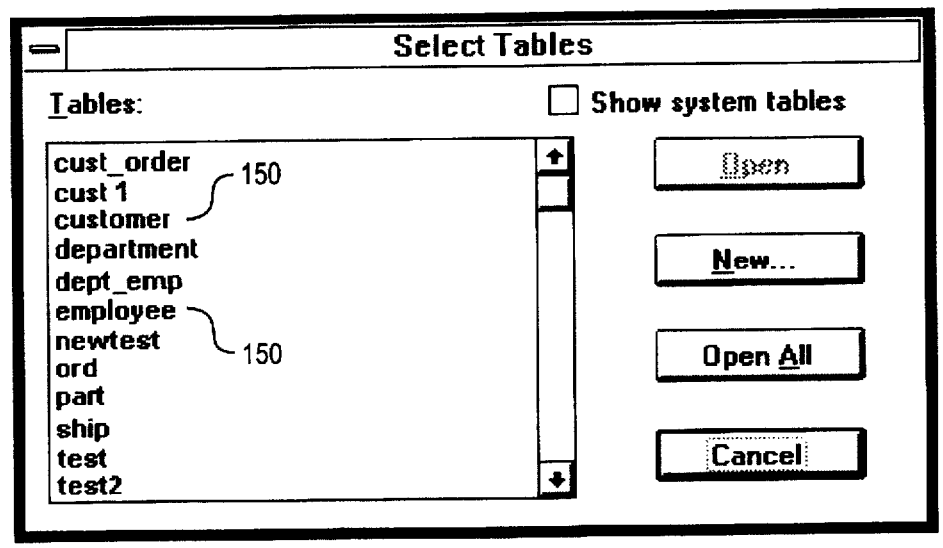
Figure 12:
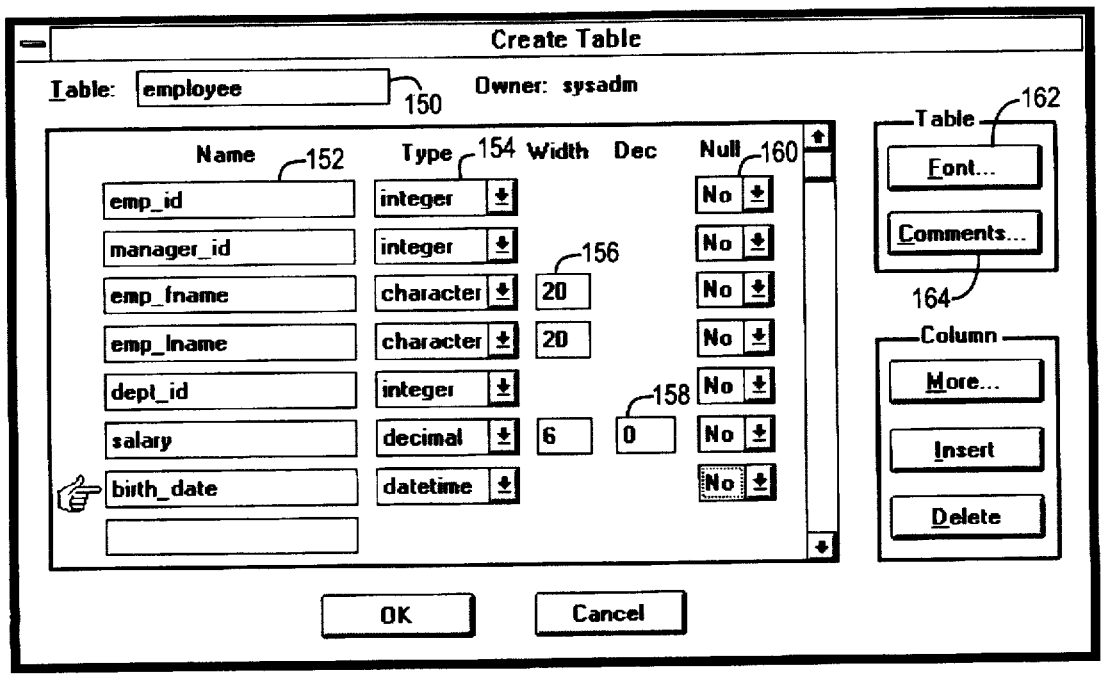

Referring to FIGS. 11 and 12, the Database Painter provides Create and Alter table features that allow the applications programmer to create a new database table or alter the definition of the table. The applications programmer can specify the name 150 of the table, the name 152 of each column in the table, the data type 154 and other required information about the data in the column (such as column width 156, number of decimal places 158, and whether NULL values are allowed 160), append columns to a pre-existing table, and in some DBMSs he can also increase number of characters 156 allowed for data in a character column and allow NULL values 160. Optionally, the applications programmer can specify a text style 162, font and size for all data in the table and document the table by entering comments 164. If no text style, font, or size is specified, the default is used when the DataWindow is initially created for the table that uses the table.

Figure 13:
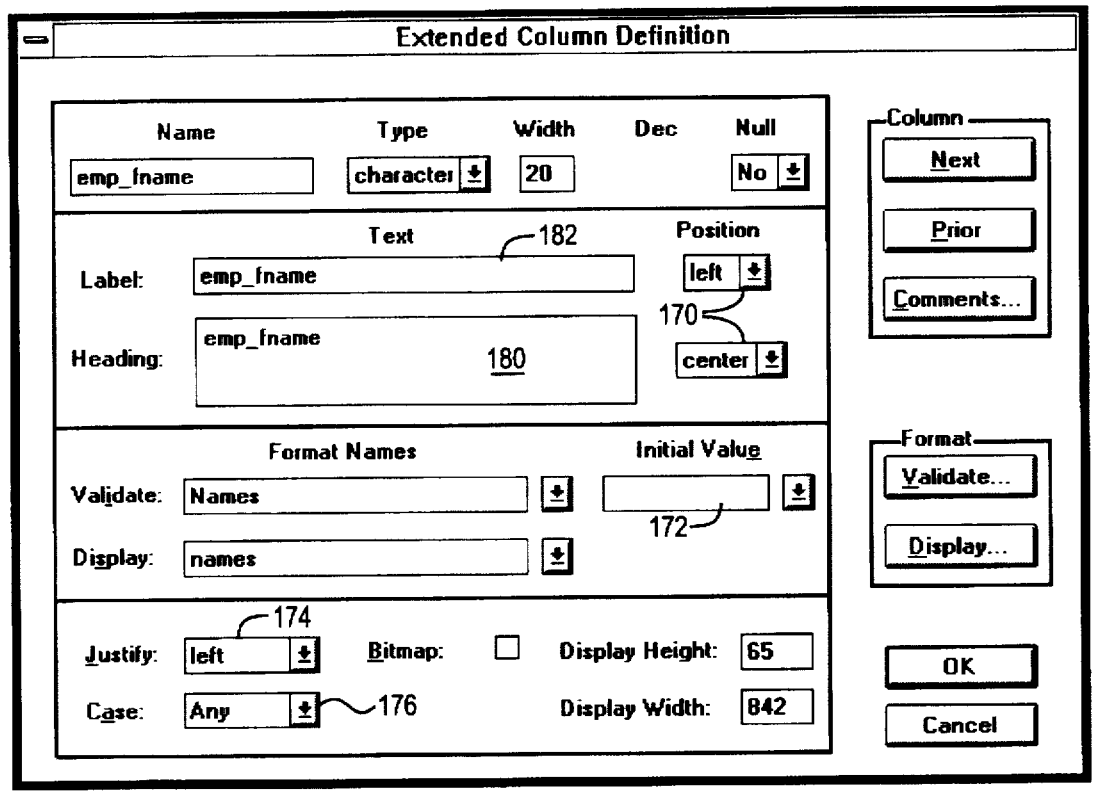

Referring to FIG. 13, in addition to the table information discussed above in the Create and Alter Table features, the applications programmer can specify extended column definition information for the columns of a table in the Extended Column Definition window, including screen position and size 170, initial values 172, text justification 174, and case 176. Extended column definition information defines how DataWindows will display the data in a column of a table and the criteria 178 used to validate data entered in the column by a user.

The extended column definition is stored in the database with the table definition and PowerBuilder will use it to display and validate data in the Database Painter, the Select Painter, and in DataWindows 24. The information specified in the Extended Column Definition window becomes default information for the column when a DataWindow is created that uses the column. A specific DataWindow can override the information for a column (using the DataWindow Painter, discussed below) but this will not change the information in the database.

The Extended Column Definition window of FIG. 13 shows the information defined for the emp_frame column of the Employee table. Note that no header or label was defined for the column and that the column name displays as both the headings 180 label 182. The Extended Column Definition window allows specification of most information by selecting from displayed options or lists of values. The exceptions are headings and labels, validation rules, and display formats, which are specified by entering the desired text.

The Extended Column Definition window allows the applications programmer to specify a validation rule or a display format, by selecting an existing rule or format from the list displayed in the appropriate drop-down list box or by defining a new format. PowerBuilder selects a default column and display size that is appropriate for the data in the column. The applications programmer can accept the default display size, change the Extended Column Definition selection, or use the mouse to change the size of the column in the DataWindow Painter.

Figure 14:
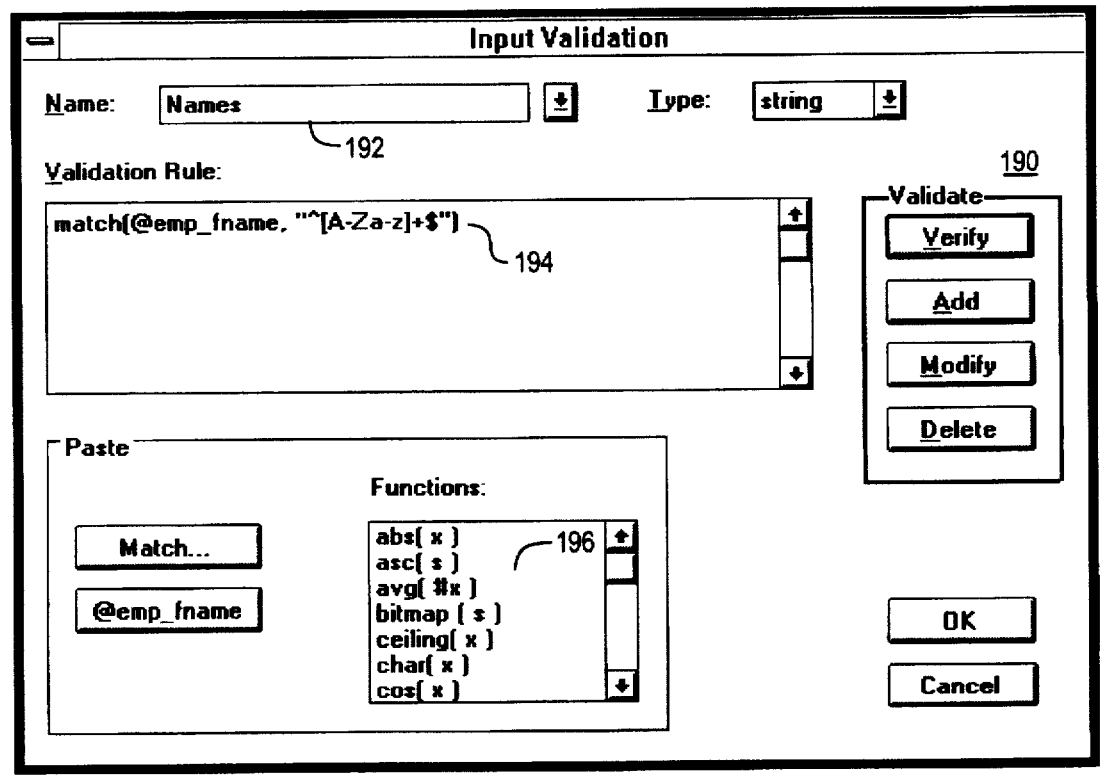
Figure 15:
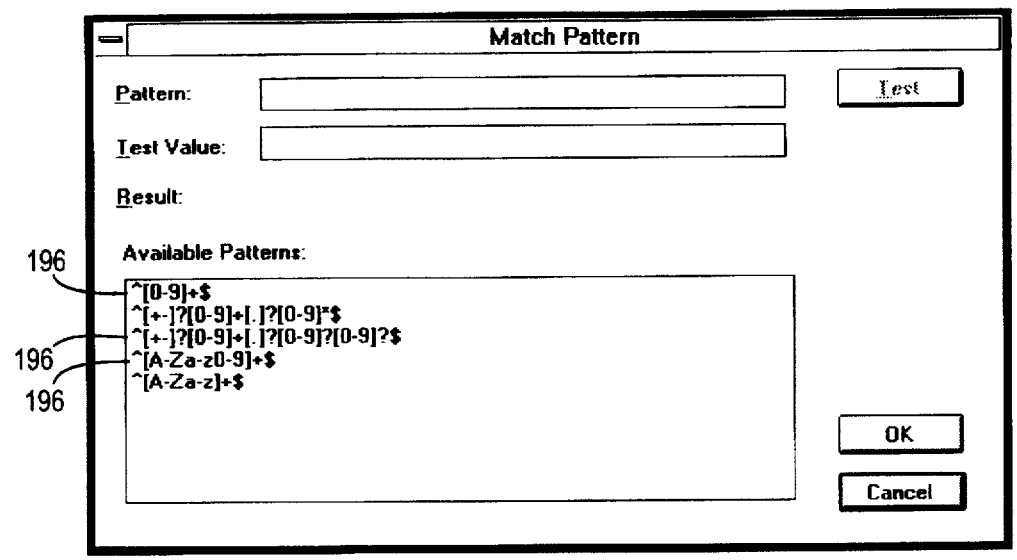

Referring to FIGS. 14 and 15, the Database Painter provides a screen 190 for defining validation rules. The applications programmer enters a name 192 for the rule and then the rule definition 194. The name will display in the Validation drop-down list box in the Extended Column Definition window as the rule for the current column and can be selected for other columns.

The functions that currently exist and that can be used to define validation rules in the current DBMS are displayed in the Functions list box 196 and can be pasted into the definition. Or, to create a new validation rule to ensure that both age and salary are greater than 0 (the initial value for these columns) using a single validation rule, a single validation rule @salary>0 can be defined and saved, and then selected as the validation rule for both columns. At runtime, PowerBuilder will substitute the appropriate values for @salary when the rule is applied.

A validation rule for a character column can use a "Match" rule 194, which can be defined and used to match the contents of the column to a specified text pattern 196 (for example ^[0–9]+$ for all numbers and ^[A—Za—z]+$ for all letters).

Figure 16:
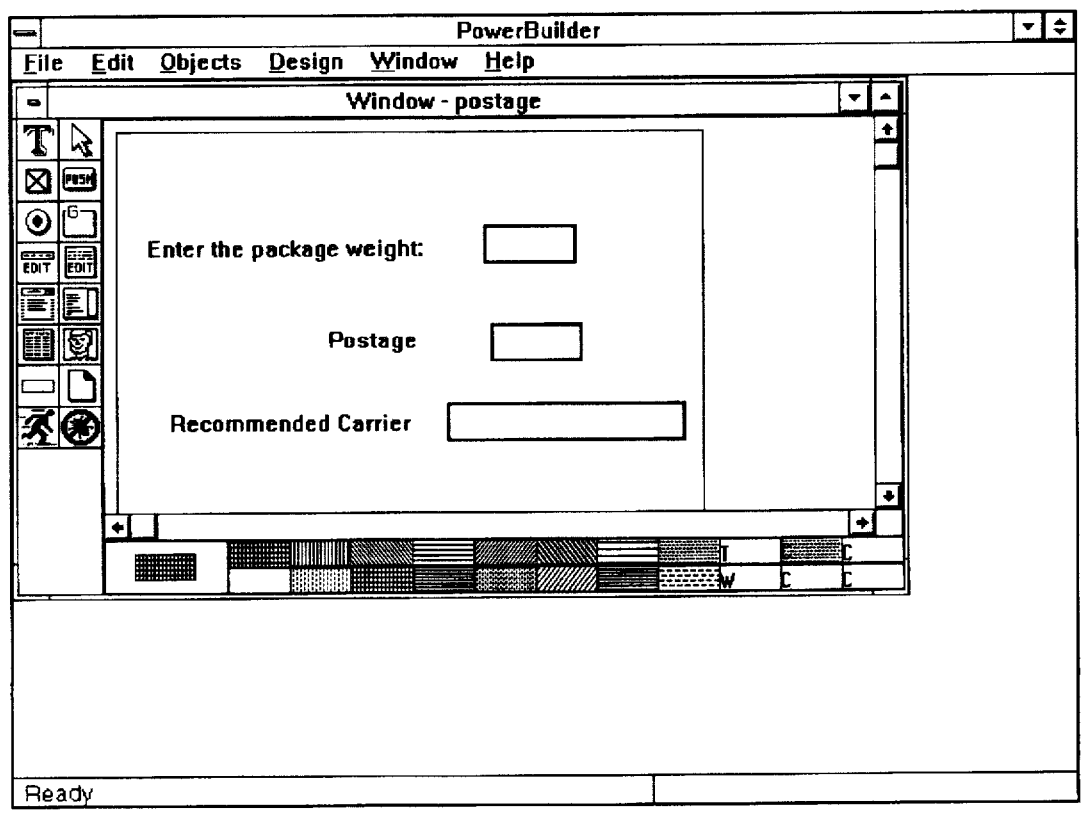
Figure 17:
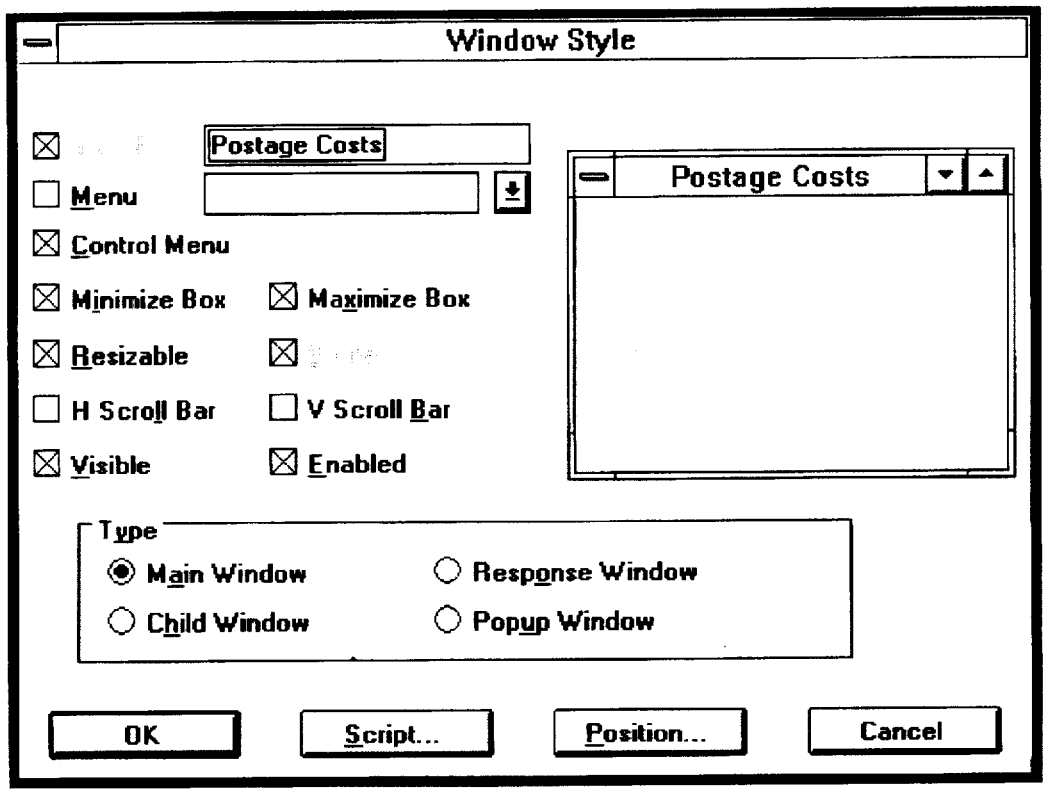
Figure 18:
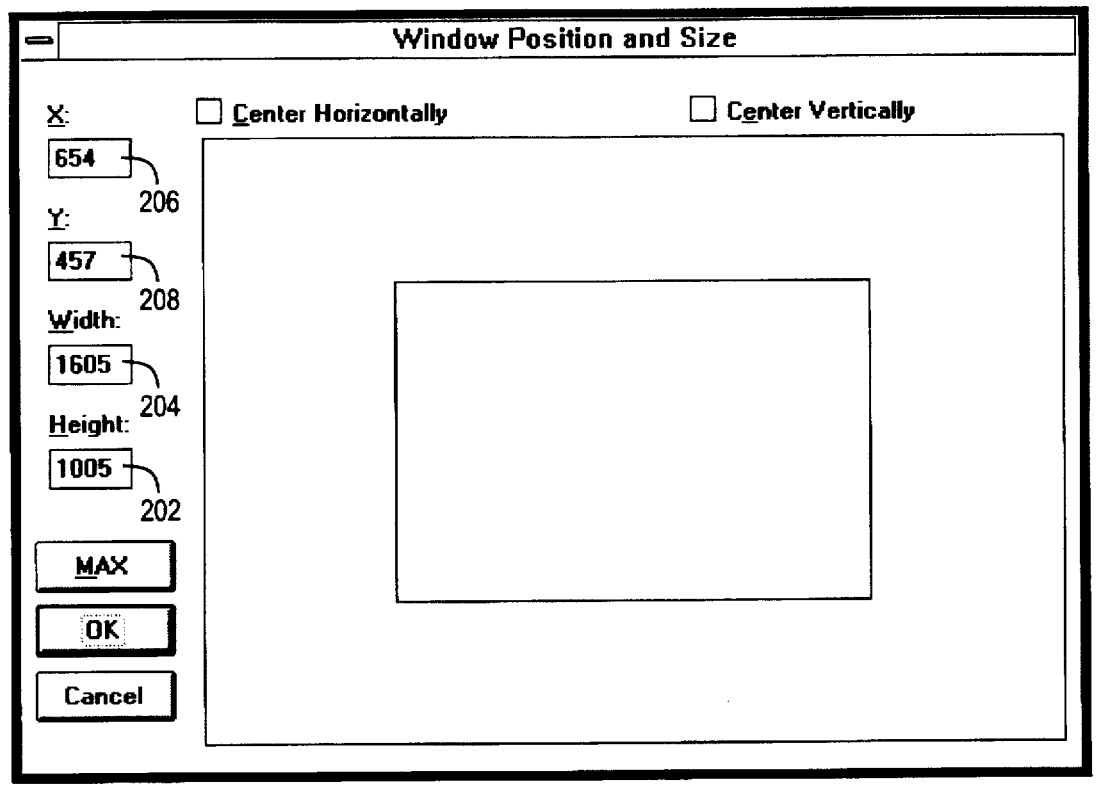

Referring to FIGS. 16–18, using the Window Painter the applications programmer can change the size of a window or window object by using the mouse or changing its Height 202 and Width 204 attributes and can move a window or window object by using the mouse or by changing the X and Y attributes 206, 208. When using the mouse, the applications programmer can see the actual size and position of the window change as he drags sides of the window.

Scripts for events in the window and the objects in the window determine how the window behaves. Scripts control the action that will be initiated when an event occurs within the window or object. Table 3 describes some of the events that can occur in a window.

TABLE 3

| Event | Occurs when |
|---|---|
| Activate | Just before a window becomes active. When an Activate event occurs, the first object in the tab order for the window gets focus. If there are no visible objects in the window, the window gets focus. |
| Clicked | The user clicks the primary mouse button in an unoccupied area of the window (that is, any area with no visible, enabled object). |
| Close | The window is closed. |
| HotLinkAlarm | After an application that supports Dynamic Data Exchange (DDE) has sent new (changed) data. |
| Key | The user presses akey and the insertion point is not in a line edit. |
| MouseDown | The user presses the primary mouse button in an unoccupied area of the window (that is, any area with no visible, enabled object). |
| MouseMove | The pointer is moved and is within the window. |
| Open | A script executes the Open function for a window. The event occurs after the window has been opened but before it is displayed. |
| Other | A Windows message occurs that is not a PowerBuilder event. |
| RemoteExec | A DDE client application has sent a command. |
| RemoteHotLinkStart | A DDE client application wants to start a hotlink. |
| RemoteRequest | A DDE client application requests data. |
| RemoteSend | A DDE client application has sent data. |
| Timer | A specified number of seconds elapses after the Timer function has been called. |

Window related functions are functions that cause an event in a window, manipulate or change a window, or provide information about a window. Table 4 describes some of the window related functions. Functions can be used to trigger events in a window object, manipulate or change a window object, or return information about a window object.

TABLE 4

| Function | Desscription |
|---|---|
| ChangeMenu | Changes the menu associated with a window. |
| Close | Closes the specified window. |
| Draw | Draws a bitmap pictute directly on the window at the location specified by the X and Y arguments. |
| Hide | Makes the window invisible. |
| Move | Places the window in a new location specified by the X and Y arguments. |
| Open | Opens the specified window and makes all its attributes and objects available to scripts. |
| PointerX | Returns the distance from the left edge of the screen to the pointer. |
| PointerY | Returns the distance from the top of the screen to the pointer. |
| Resize | Changes the size of the window based on the width and height arguments. |
| Send | Sends a specified Microsoft Windows message to the specified window or window object. Use only to send messages to windows and window objects that you have created. |
| Trigger Event | Sends an event to a window or window object, and executes the script associated with the event. |

When the applications programmer is done defining a DataWindow object, he closes the Window Painter. The Window Painter asks if the current window is to be saved. The applications programmer clicks Yes, and enters the name to use for the window and the application library in which to save the DataWindow object. PowerBuilder saves the window, its objects, and its scripts in the specified application library.

In a single application program, it may be desirable to display several windows that are identical in structure but have different data values. For example, an employee database interface object that displays two or more employees at the same time may open multiple copies (instances) of a Win_Employee_Address window. To do this, the applications programmer builds and saves a window, and then creates an array of instances of the window. Saving a window in the Window Painter saves the definition of the window and the definition becomes a class (essentially a new data type) with the same name as the window. The applications programmer would more typically create multiple instances of pop-up or child windows rather than multiple instances of main DataWindows 24 or application windows.

A common way to close the instances of a window is to put a CommandButton in the window with this script for the clicked event:

Close (parent) This script closes the parent of the button (the window in which the button displays).

Overview of a DataWindow object

As shown in FIG. 1, as a user uses a completed PowerBuilder application, a typical screen display consists of several objects, including a window 18 within which are displayed several more objects such as command buttons 20a–20d, which indicate and activate typical database operations, e.g., RETRIEVE, NEW, DELETE, and UPDATE. The window 18 further includes other objects such as a DataWindow 24 which has unique capabilities to retrieve, display, and manipulate data stored in an application database table (all of which features are described in detail below). For example, the DataWindow 24 contains edit boxes 22a–22n which allow the user to enter or edit data for various columns displayed in the DataWindow. A list of other objects that can be included in the window 18 appears below in Table 5.

TABLE 5

Objects Within Windows

| Object | Description |
|---|---|
| CheckBox | Small square box representing an option that the user can switch on or off. When it is on, an X appears in the box. |
| CommandButton | Large grey rectangle with words in it. When clicked, it carries out an immediate action, e.g., a script. |
| DataWindow | Window having programmable attributes and scripts for indirect SQL database display and manipulation. |
| DropDownListBox | A combination box, comprised of a text box with an arrow to its right. Clicking on the arrow displays a list of available choices. |
| GroupBox | Rectangle with a title, enclosing a group of related options. |
| HScrollBar | Horizontal scroll bar with left and right arrows at each end and a movable button that the user can slide along its length. |
| Line | Solid or dashed line. |
| ListBox | A column of available options, from which the user can choose one or many options. |

TABLE 5-continued

Objects Within Windows

| Object | Description |
|---|---|
| MultiLineEdit | Text box into which the user types one or more lines of information. |
| Oval | Circular or elliptical line or solid figure. |
| Picture | Bitmap graphic image prepared with scanner or painter application software. |
| RadioButton | Small circle representing an option that is part of a mutually-exclusive group of options. Selecting one turns off the previously selected RadioButton, and places a black dot in the selected circle. |
| Rectangle | Rectangular or square outline or solid box. |
| RoundRectangle | Rectangular or square outline or solid box with rounded corners. |
| SingleLineEdit | Text box into which the user types one line of information. |
| StaticText | Headings, labels, and other text that cannot be changed by the user. |
| VScrollBar | Vertical scroll bar with top and bottom arrows at each end and a movable button that the user can slide along its length. |

An object of particular importance in window 18, is the DataWindow 24, which is used to present and manipulate data taken from an application database 26, e.g., a SQL Server, SQLBase, or ORACLE database, without requiring the user to code application specific database instructions. The DataWindow 24 is an "intelligent" window object in that it contains specific knowledge about a portion of a database or another data source. Specifically, the DataWindow 24 is able to determine, based on the SQL Statement defined earlier, whether an update operation may be performed on the application database 26 to incorporate changes made to data displayed in the DataWindow 24, e.g., a user's modifications or additions to the data in edit boxes 22.

As noted above, the DataWindow 24 displays data in a specific style defined by the presentation definition 16 which the applications programmer defined using the DataWindow painter 12. After the DataWindow 24 is placed inside the window 18, the applications programmer may size it, position it, specify its style, and build scripts for events that can occur in the DataWindow 24.

Every window and window object has a style that determines how it looks to the user. The style is determined by values assigned to the attributes of the object.

Figure 19:
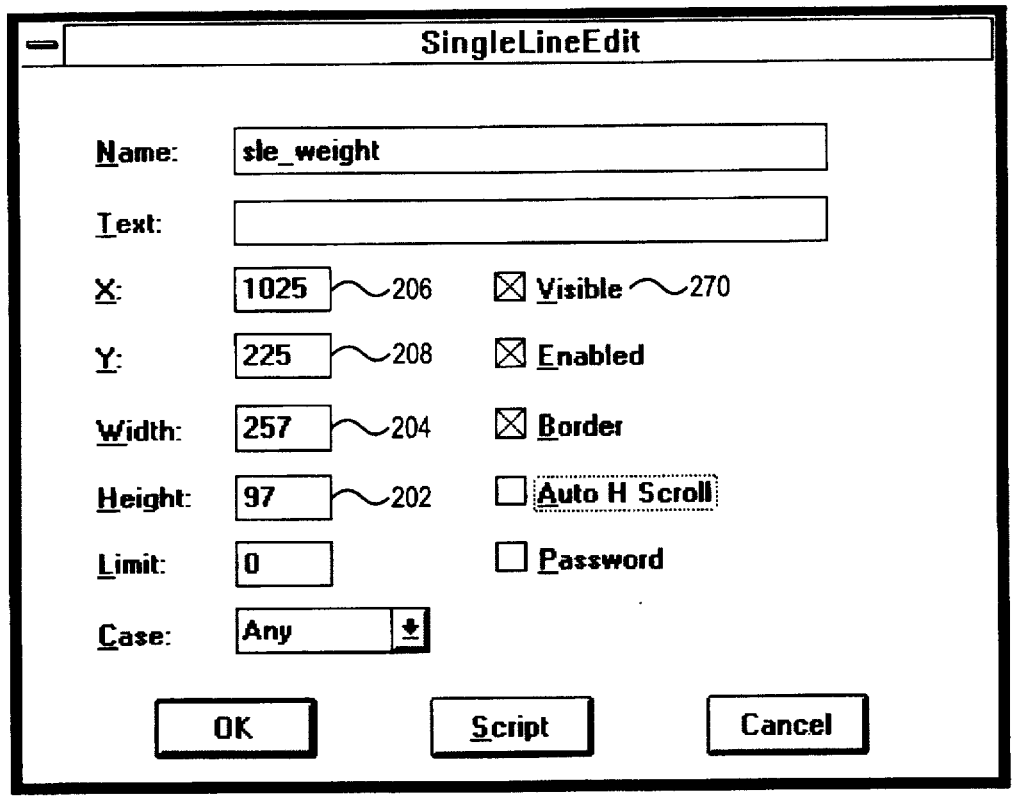

Referring to FIGS. 18 and 19, the applications programmer uses the Window Painter to specify the values of attributes by selecting style options that correspond to the attributes of a window or window object. To set these values for a window or window object, the applications programmer can double-click the object or select an Object Style from a menu presented by the DataWindow painter (the style window for a window is shown in FIG. 18 and for a SingleLineEdit is shown in FIG. 19). The default settings for the attributes of the window object are continuously displayed as they are modified in the Window Painter.

Referring again to FIGS. 8 and 9, like other window objects, a DataWindow 24 is useful only with a client program to invoke the methods of the DataWindow 24, for instance when the DataWindow is placed in a window. After the applications programmer places the DataWindow in the window, he can size it, position it, specify its style, and build scripts for the events that can occur in the DataWindow object. Functions in the scripts for other objects can communicate with the DataWindow object. For example, the DataWindow object's Retrieve method 34a retrieves data when a Clicked event occurs in a "Retrieve" CommandButton 20a. For another example, a script for a Clicked event of an "Update" display button 20d might invoke the DataWindow's Update method to update the database.

After the applications programmer has placed the DataWindow in a window and created scripts to retrieve, update, and manipulate data in the DataWindow 24, users can use the DataWindow to obtain information from a database, modify the information, and then update the database with their modifications.

To place an object (e.g. a CheckBox, CommandButton or DataWindow) in a window, the applications programmer selects a window object class from the Window Painter toolbox menu and then selects the screen position for the window object. After the window object is placed, the applications programmer can size and position it, define its style and create scripts for its events. To change the size or position of a window object, the applications programmer uses the mouse in the window workspace or changes the object's size and position attributes in the object's style window. When the user uses the mouse to select a position, he can see the position change as he makes the change.

A script 30 contains a series of instructions 32 and is typically paired with an object, e.g., a command button 20, so that when an object is selected by the user or otherwise activated, e.g., by an event generated by another script or raised by a mouse button click, the script 30 is executed. Some typical object/event pairings are shown in Table 6.

TABLE 6

TYPICAL OBJECT/EVENT PAIRS.

| Object | Event Name | Event Description |
|---|---|---|
| CommandButton | Clicked | User clicks mouse on the CommandButton. |
| DataWindow | RetrieveStart | TheDataWindow is about to begin retrieving information from the SQL database |
| SingleLineEdit | Modified | User enters or changes text, then presses "Enter" key or moves pointer to another object. |
| Window | Open | Application has opened this window. |

Scrips for eventes in window objects determine how the objects behave; the action that will be initiated when an event occurs in the object. The applications programmer can refer to windows, MenuItems, and other window objects in scripts for an object.

In addition to the object/event pairings shown in Table 6, the applications programmer may also use events that occur in the scripts of other objects to communicate with and modify the DataWindow 24. For example, the applications programmer can use a Retrieve function in a command button script to retrieve data when a Clicked event occurs or use an Update function in yet another command button script to update the database when a Clicked event occurs.

Selecting the Data Source

Figure 2:
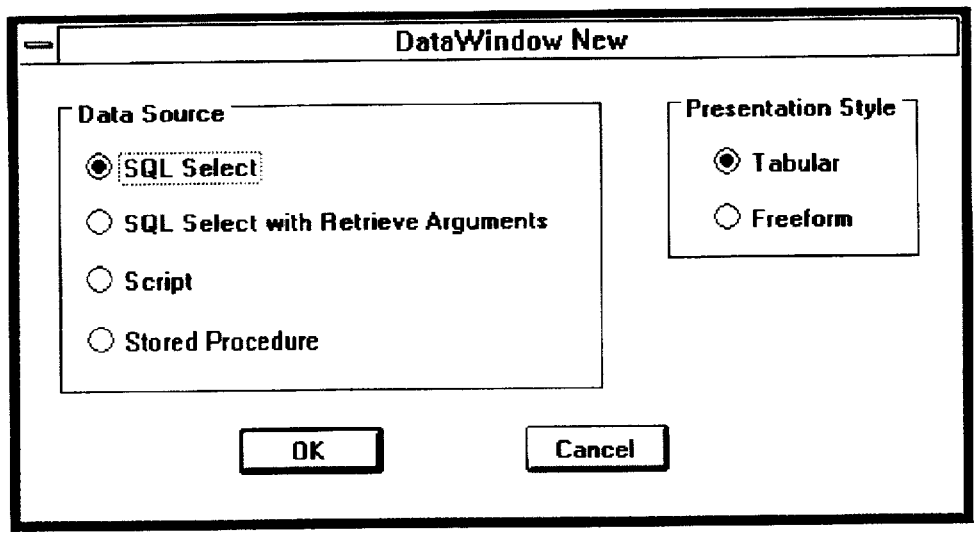
FIGS. 2 and 3 are screen displays illustrating the generation of database selection statements.

Referring to FIG. 2, to create a DataWindow 24, the applications programmer initiates the DataWindow painter 12 (FIG. 1) and specifies a source for the data (SQL Select, SQL Select with Retrieve Arguments, Script, or Stored Procedure) that will be used in the DataWindow 24 and defines the presentation style (e.g., tabular or free form, headers, colors, borders, etc.) of the DataWindow. In selecting the data source, if the DataWindow 24 contains data retrieved from a database, the applications programmer chooses the SQL select option (either with or without arguments that define the data source) and defines the SQL SELECT statement that will be used to retrieve the data. If, on the other hand, the data will not be associated with a database, e.g., the data will be imported from a Dynamic Data Exchange (DDE) application, the applications programmer selects the Script option and defines the result set for the data to be used in the DataWindow 24. Note, however, that the DataWindow 24 can be used to update the data source only if the data source chosen is one of the SQL Select options.

The data source is the source from which the DataWindow 24 obtains the data that will be used in the DataWindow 24.

When the applications programmer selects the SQL Select with Retrieve Arguments option as the data source for the DataWindow 24, he or she further defines the arguments for the SELECT statement and references them in the WHERE, GROUP BY, ORDER BY, or HAVING clauses of a typical SQL SELECT statement. That is, a typical SQL SELECT statement selects several columns from each row in a database table that has a desired value in a particular column. For example, in the SQL SELECT statement shown in FIG. 3, the columns EMP_ID (employee ID number), EMP_FNAME (employee first name), and EMP_LNAME (employee last name) are retrieved from the each row in the database table EMPLOYEE that has a department ID equal to the current value in the retrieve argument ":dept".

To retrieve data for a DataWindow 24, a script for the window that contains the DataWindow calls the Retrieve function. If the applications programmer selected an SQL Select with Retrieve Arguments, the script passes the values of the retrieve arguments to the function.

If the Database Management System (DBMS) 100 supports database stored procedures, the DataWindow painter allows the applications programmer to select a stored procedure as the data source. The Stored Procedure radio button displays only when the DBMS supports stored procedures.

Figure 3:
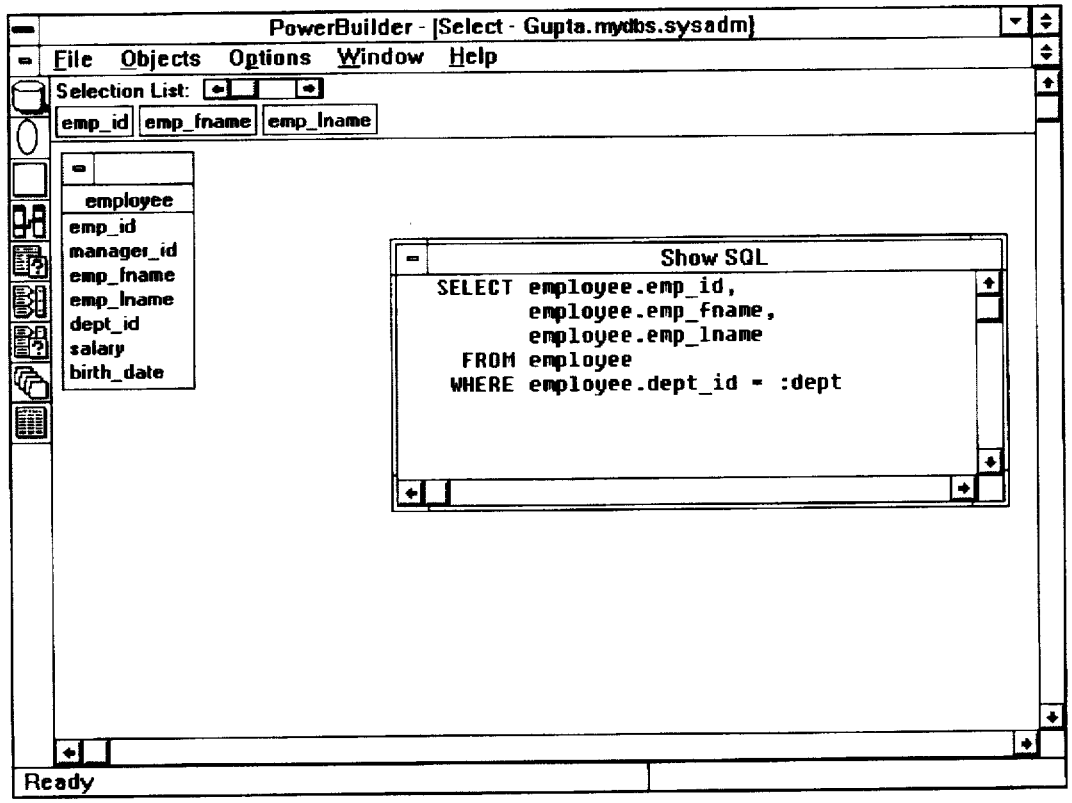

Referring again to FIG. 2, if on the other hand, the applications programmer chooses the SQL Select (without arguments) as the data source for the DataWindow 24, he or she may decide later to use arguments and can define them through an edit function. In either event, after the applications programmer specifies the retrieve arguments, if any, a Select Tables window (not shown) appears and lists the tables in the current database from which the applications programmer selects one or more tables. Referring to FIG. 3, having selected a table, e.g., the EMPLOYEE table, from the Select Tables window, the applications programmer next selects the columns to use from that table, e.g., EMP_ID, EMP_FNAME, EMP_LNAME, and specifies any additional selection criteria.

If the data will not be associated with a database (for example, the data will be imported from a Dynamic Data Exchange application), the applications programmer selects "Script" in FIG. 2 and defines the result set for the data to use in the DataWindow 24.

Figure 4:
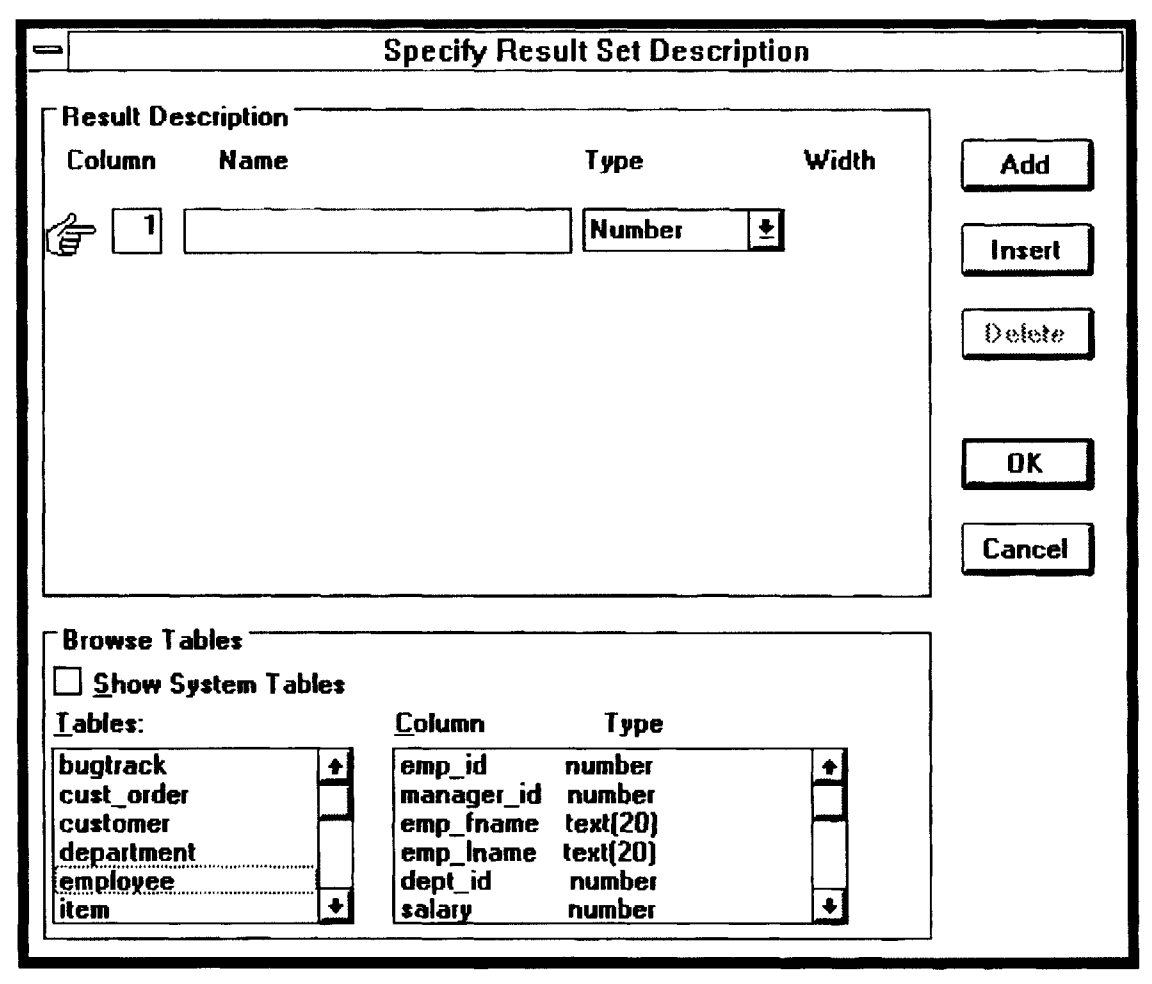

If the applications programmer selected Script as the data source for the DataWindow 24 (FIG. 2), a Specify Result Set Description window (FIG. 4) appears and displays the first column and boxes for the name of the result set, its data type, and (if appropriate) its width. The window also lists the tables in the current database. If the applications programmer selects one of the tables listed, the name and data type of each column in the table appears in the window. To describe the result set, the applications programmer enters the column descriptions in the boxes or selects a database table that resembles the result set, selects columns from that table, and modifies their descriptions accordingly.

Figure 20:
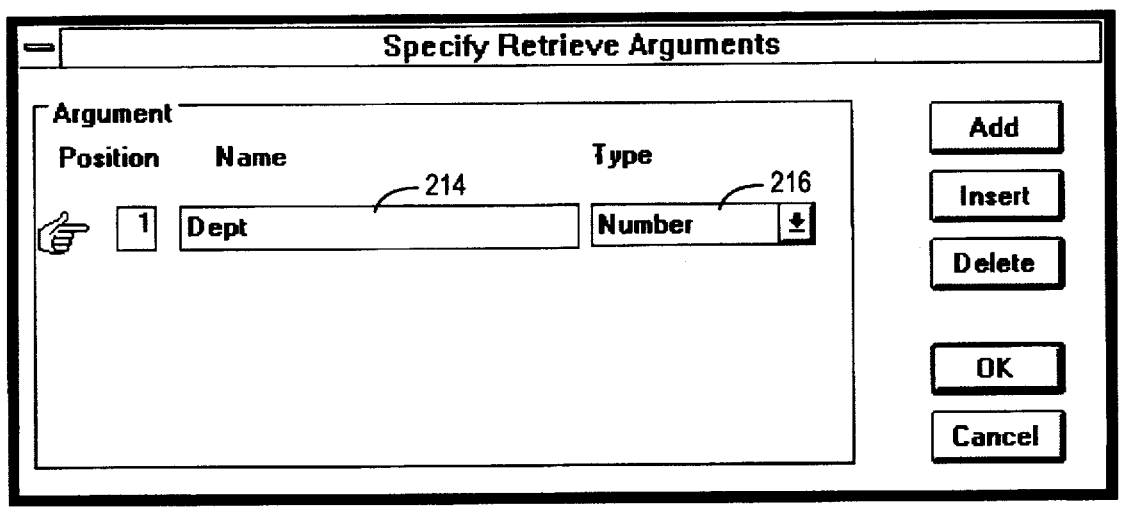

Referring to FIG. 20, the applications programmer may select as the data source an SQL Select statement with Retrieve Argument. For SQL select with Retrieve Arguments, the DataWindow painter provides screens into which the applications programmer types select arguments 214 with their data types 216 for arguments to the retrieve function.

Figure 21:
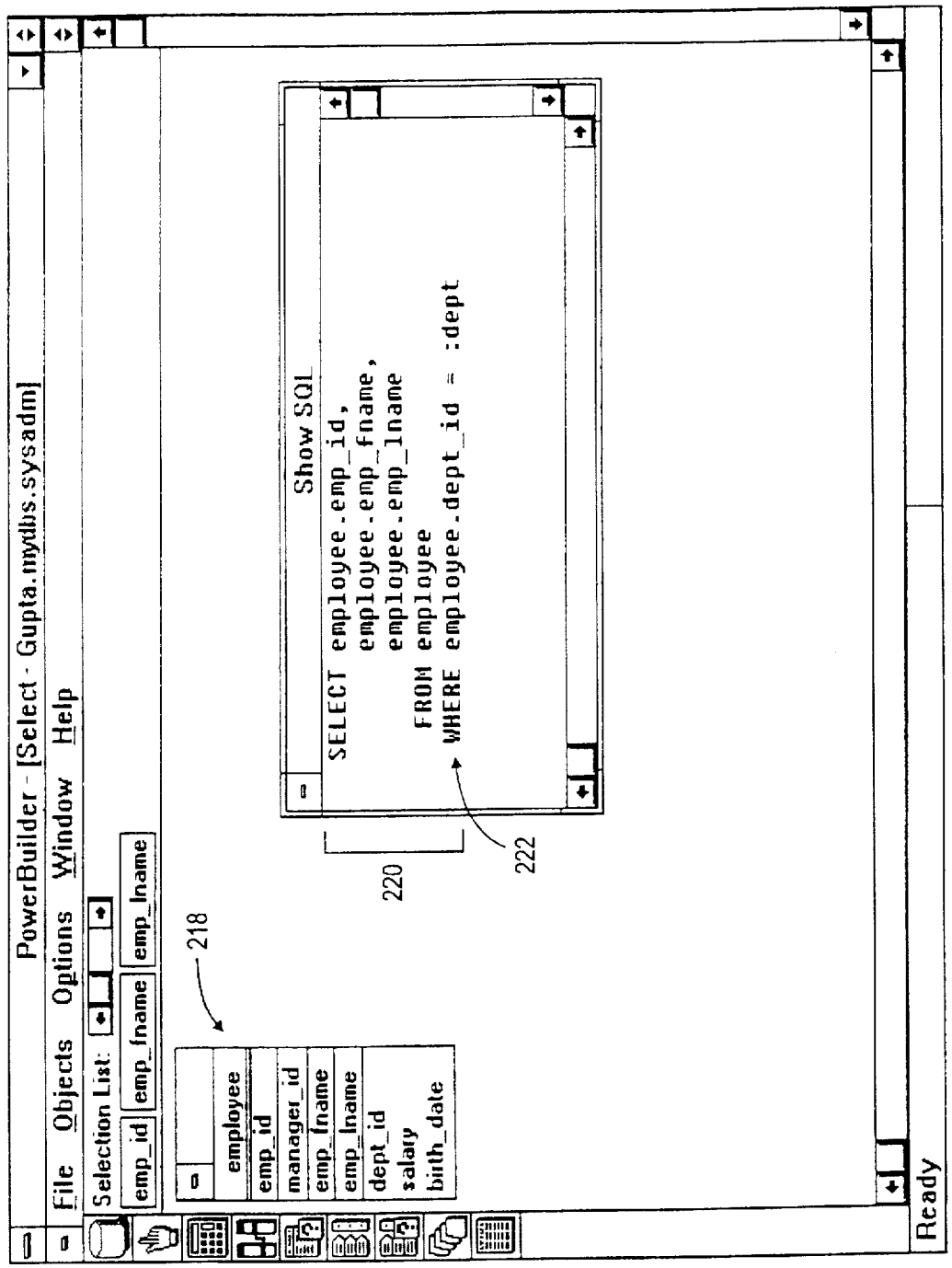

Referring to FIG. 21, after specifying the Retrieve arguments, the Select Tables window lists the tables 218 in the current database. The applications programmer can select the data source tables, columns, and any additional selection criteria. The DataWindow painter helps to create an SQL SELECT 220 with retrieve arguments, WHERE, GROUP BY, or HAVING clauses 222, by providing screens accessed by icons. In the example of FIG. 21, the argument Dept, which was defined previously, is referenced in a WHERE clause.

Figure 22:
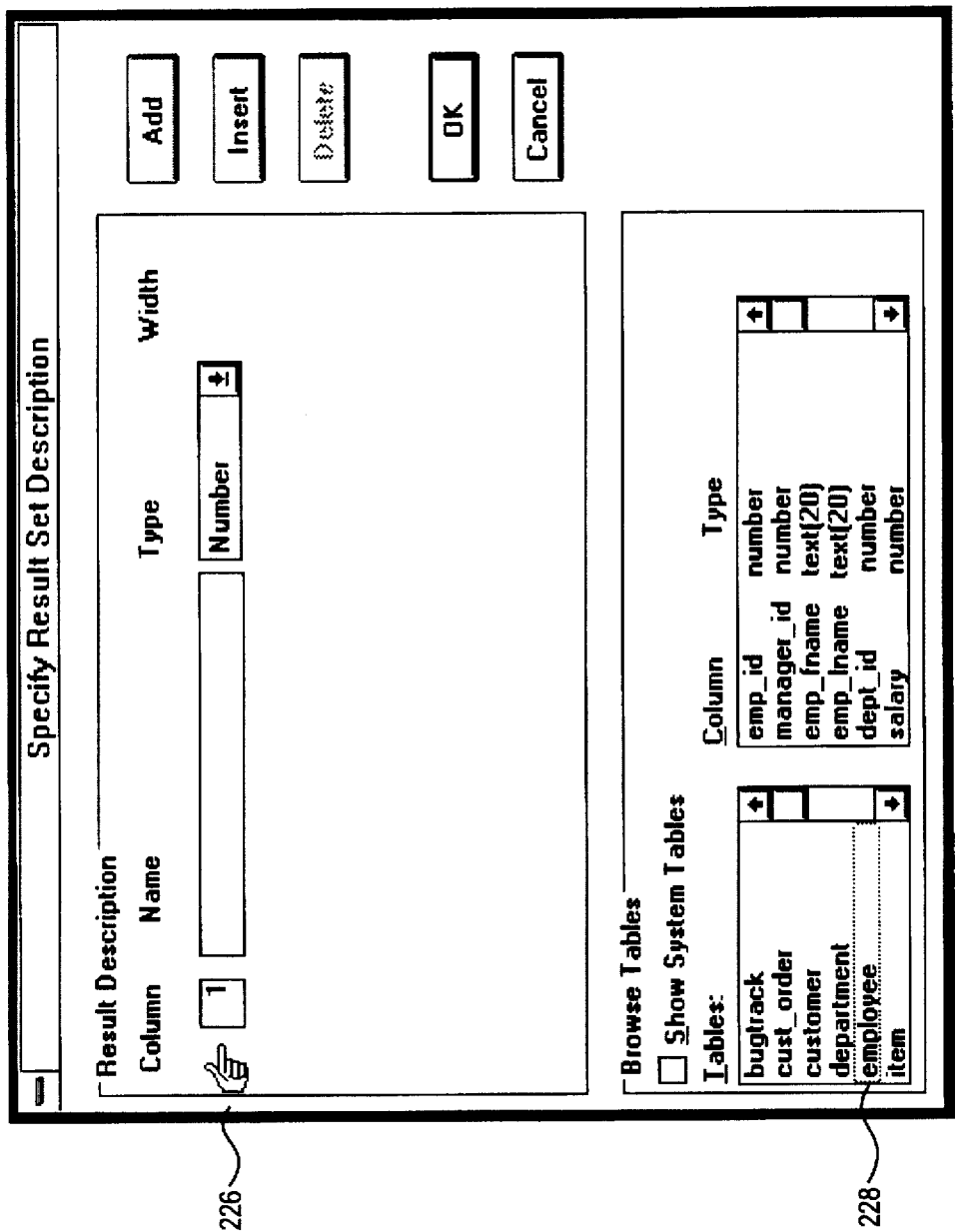

Referring to FIG. 22, the DataWindow painter provides screens to describe the result set as well. To describe the result set, the applications programmer enters the column descriptions 226 in the boxes or selects a database table 228 that resembles the result set.

Figure 23:
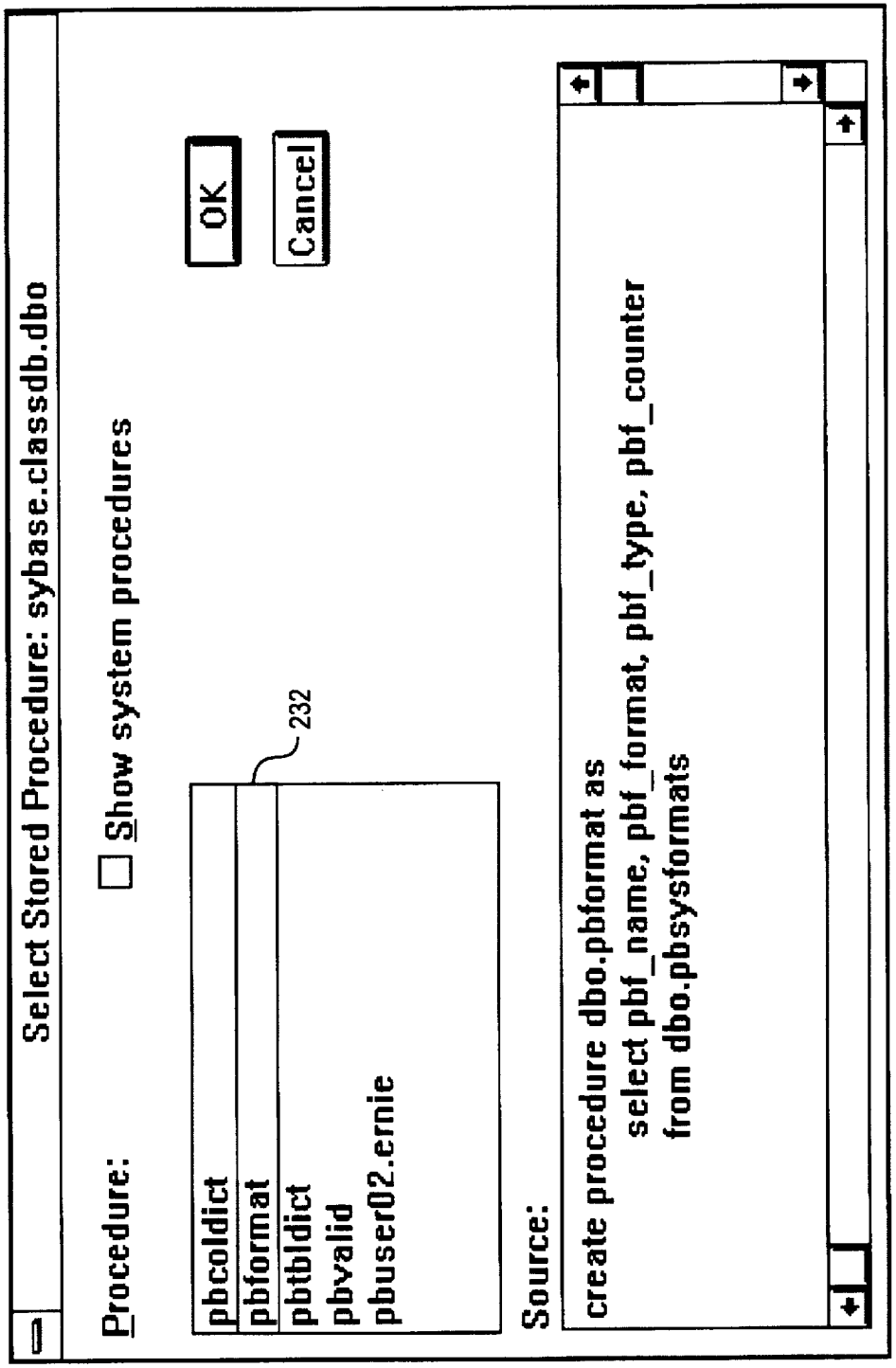

Referring to FIG. 23, the DataWindow painter provides screens to help select a Stored Procedure as the data source. The applications programmer can select a stored procedure from the list 232, using the mouse to browse through stored procedures (the syntax of the selected procedure displays in a box). The DataWindow painter will ask the applications programmer to define a Result Set as well.

See the discussion below of importing and exporting data for discussion of other data sources and destinations.

Selecting a Presentation Style

Having selected a data source for the DataWindow 24 via one of the options described above, the applications programmer must next select a presentation style. The style selected for a DataWindow determines its initial layout and display. There are two basic presentation styles: tabular and freeform. The tabular style has vertical columns and headers which display above the columns (see, for example, the DataWindow 24' of FIG. 5). The freeform style has horizontal columns, Extended Column Definition positioning, and labels for the columns (see, for example, the DataWindow 24 of FIG. 1).

Figure 24:
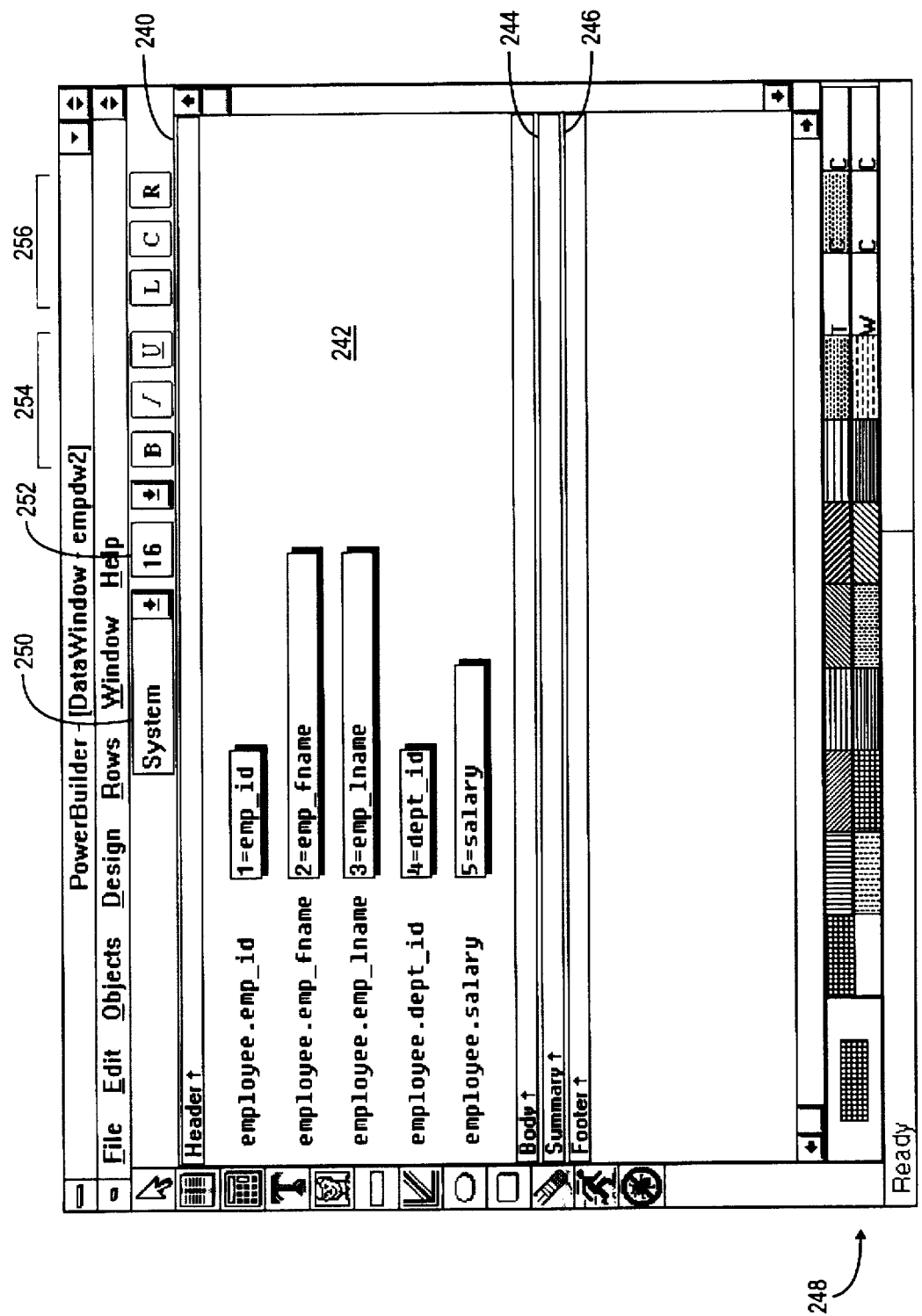

Referring to FIG. 24, the applications programmer selects an initial layout for the DataWindow. This is the format PowerBuilder uses to initially display the DataWindow in the DataWindow Painter workspace. The final application can use the format as automatically generated, or the applications programmer can modify it to meet design standards.

The initial headers and the labels are the headers and labels specified in extended column definition in the Database Painter. If text was not specified for a header or label in the Database Painter, the column name displays as the header or label. The applications programmer can change the header or label for the current DataWindow by selecting the header or label and modifying. This will not change the text in the database.

The freeform style is shown in FIG. 24. Note that the headers and labels are the column names.

Figure 25:
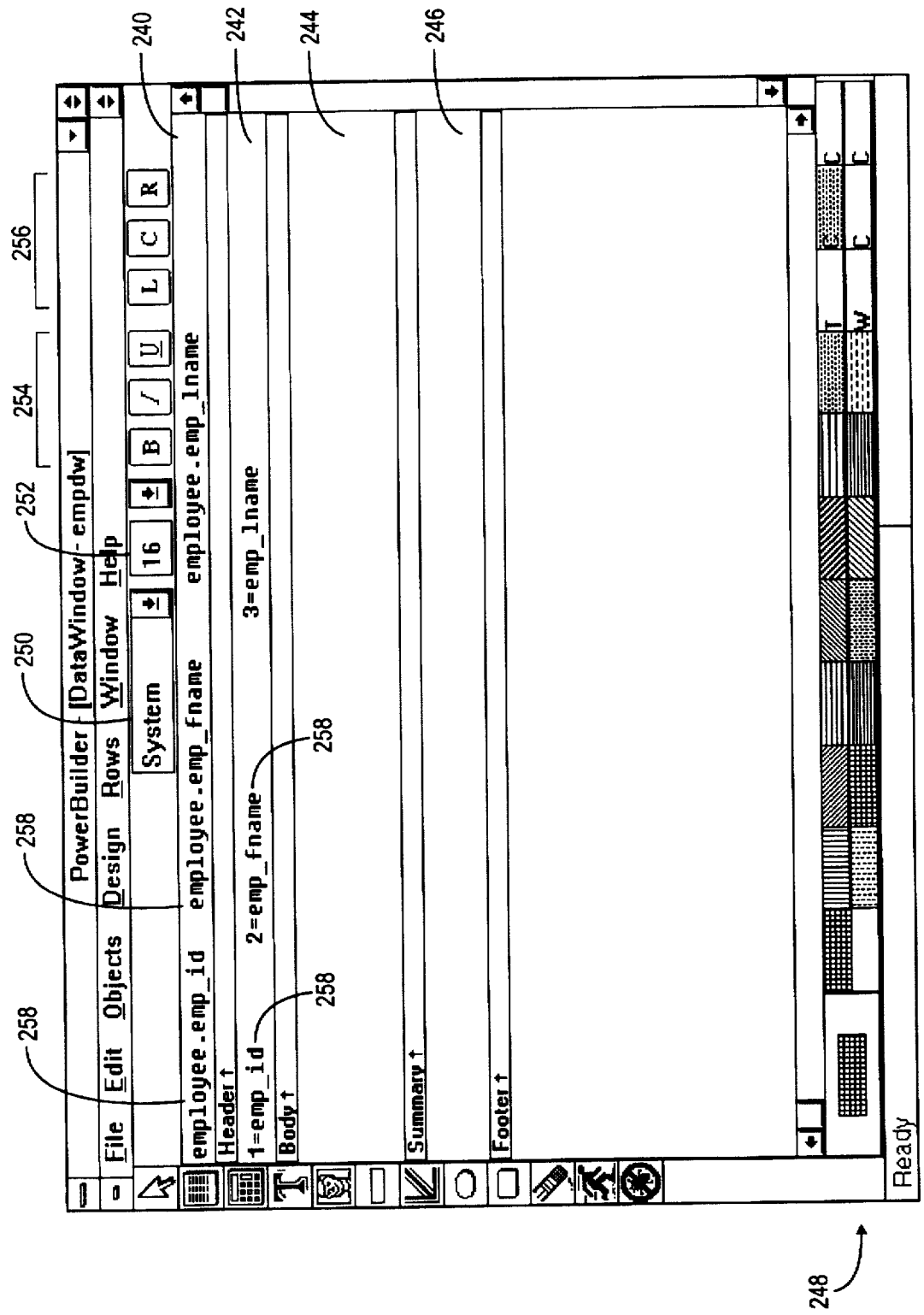

In tabular style, the DataWindow is divided into four areas as shown in FIG. 25 and described in Table 7: Header 240, Body 242, Summary 244, and Footer 246. Each area is identified by a bar containing the name of the area above the bar and an arrow pointing to the area.

TABLE 7

| Area | Typically used to display. |
| --- | --- |
| Header 240 | Heading information for the DataWindow and column headings |
| Body 242 | Data and labels associated with the data. The contents of the body may repeat in the DataWindow. The size of the DataWindow at runtime determines how many rows display. |
| Summary 244 | Total and summary information for the DataWindow that displays after the last row in the body. |
| Footer 246 | Information to display at the bottom of every page (screen). |

In the freeform DataWindow of FIG. 24, the areas of the window are shown as they display initially. Note that initially only one row of data displays in the body area 242 and there is almost no room in the header, summary, and footer areas. The applications programmer can reapportion the screen real estate among the four areas with mouse drags.

FIG. 25 shows the DataWindow Painter workspace with a tabular presentation style. Note that the summary area 244 and footer area 246 have been enlarged. The header area 240 is shown as it displays initially.

The applications programmer can place text, drawing objects (such as lines, rectangles, and ovals) and bitmaps in any DataWindow area. Drop-down list boxes allow selection of a font and size for text. Style buttons displayed on the screen allow selection of text styles, bold, italic and underline, left justification, center justification, right justification. A color bar 248 allows creation of custom colors and specification of color, including transparent, for the background and foreground. The DataWindow painter displays default font 250, font size 252, style 254, color, and justification modes 256; the color defaults are displayed in the first box of the color bar.

The header area displays report heading information. When the DataWindow workspace displays for a new DataWindow, the presentation style determines the contents of the header area. If the presentation style is tabular, the headings defined for the columns in the Database Painter display in the header area and the columns display on a single line in the body area. If the presentation style is freeform, the header area is blank. The applications programmer may add additional heading information (for example, a date) for the DataWindow in the header area and can include bitmaps (for example, the company logo) and drawing objects or color, to enhance the appearance of the area.

The body of the DataWindow is where the data (details) that have been retrieved from the database display and where the user enters new data and updates existing data. The number of rows of data that display in the DataWindow at one time equals the height of the runtime DataWindow less the space required for headers and footers divided by the height of the body.

When the DataWindow Painter workspace displays for a new DataWindow, the presentation style determines the contents of the body area 242. If the presentation style is tabular (FIG. 25), the body displays column names 258 and the headers for each column display in the Header area 240. If the presentation style is freeform, the labels defined for the columns in the Database painter display in the body area along with boxes for data.

The summary area 244 and footer area 246 of the DataWindow usually are used the same way the total (summary) pages and page footers are used in a print report. The contents of the footer area displays at the bottom of each page (screen) of the DataWindow. The contents of the summary area, which display at the end of the DataWindow, often summarize information in the DataWindow. The applications programmer can design the header and footer to contain any desired information, including text, drawing objects, and computed columns containing aggregate totals. The appearance of the footer and summary areas can be enhanced with drawing objects, color, text styles and fonts, and borders around selected text. PowerBuilder provides aggregate functions including Average, Count, Max, Min, and Sum.

Designing Columns

Figure 26:
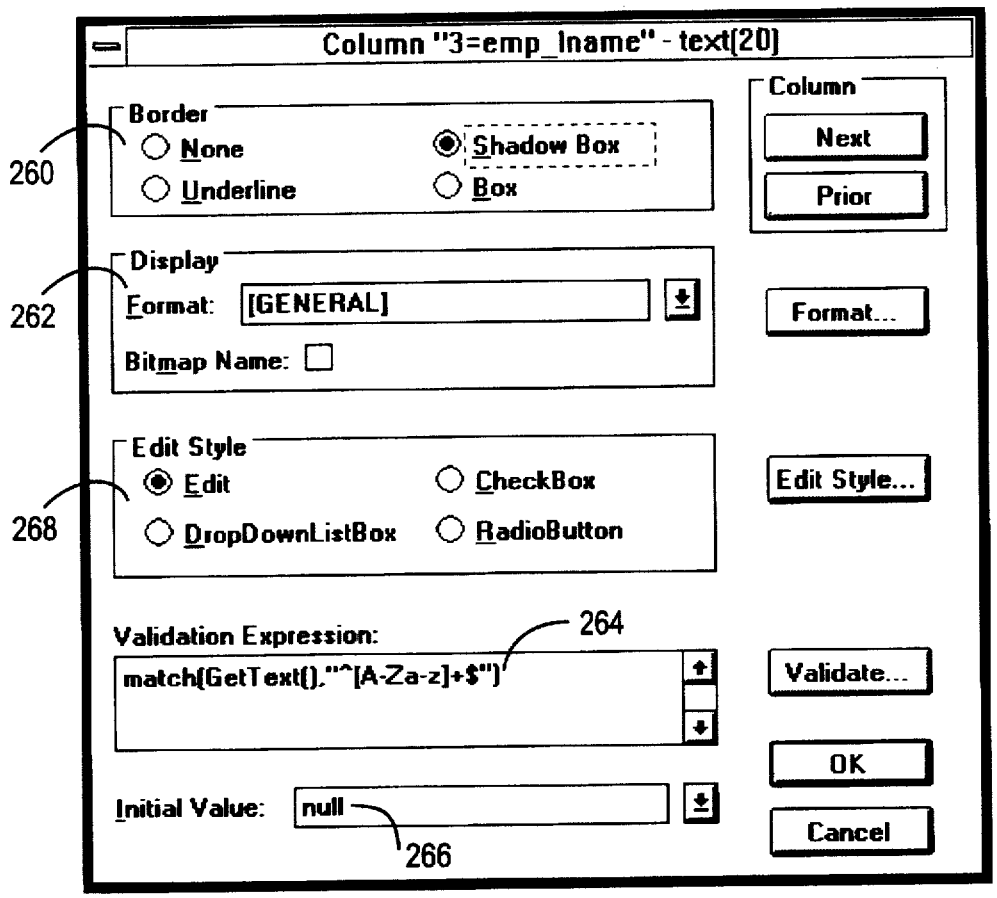

Referring to FIG. 26, when the applications programmer designs a DataWindow, he specifies how each database column of the DataWindow will look and rules for verifying user-entered data. For each column, the applications programmer can select a border, specify and define a display format, display a bitmap of a bitmap column, specify and define validation expressions, specify an initial value, and/or select an edit style and define a code table.

PowerBuilder allows the applications programmer to specify that a column is to be displayed but is not modifiable. The applications programmer calls the function SetTabOrder, specifying the DataWindow, a column, and the tab value of zero to indicate that the column is read-only.

Note that many of these selections were available in the Database Painter, discussed above. When a DataWindow 24 is created, the information defined in the Extended Column Definition window in the Database Painter for the columns used in the DataWindow becomes the default for the DataWindow's column options. The display format, validation expression, and initial value specified displays in the Column window and can be overridden for the current DataWindow. The changes made in the DataWindow do not change the information stored with the column definition in the database.

Display formats determine how data displays, such as amounts preceded by a dollar sign, dates spelled out, and a color for negative numbers. The format for a column can be queried in scripts using the GetFormat function, or changed in a script using the SetFormat function. PowerBuilder supports display formats for dates, numbers, strings, and times. Each format has at least two sections. Each section specifies the format for a particular type of value (for example, a time and NULL). The sections are separated by semicolons(;):

TIME-FORMAT; NULL-FORMAT Different types of display format masks can be used in a single format; use a space to separate the masks. For example, this format section includes a date and time format mask:

mmmm/dd/yyyy h:mm

Spaces and punctuation characters display as entered in the mask (for example, dollar signs, commas, and decimal points displays as themselves).

A color can be specified for each section of the display format by specifying a color keyword before the format. The color keyword is the name of the color or the long that represents the color enclosed in square brackets: or |RED|or |16711680|. The long is usually used in the color keyword when a precise color is required.

A display format can be selected from a list displayed in the drop-down list box automatically displayed by the DataWindow painter, or the applications programmer can define a new format for the column. A format definition window displays a box in which he can enter a new format and a list of the formats that are currently available.

As an alternative to using a built-in display style (e.g., verbatim display of text in the database, or decimal character display of numeric data), the applications programmer may define his own display style using a code table. A DataWindow 24 can use a code table to specify the display value for any DataWindow column in which the user can enter information. A code table consists of rows of code table entries. Code table entries are pairs of corresponding strings: a Display Value string and a Data Value string. The applications programmer can define and modify a code table for a column in a DataWindow 24 when he defines the Edit Style for a column, or can clear the table manually in the edit styles windows.

The code table shown in Table 8 displays the full name of a New England state when the user enters the two-letter abbreviation for the state and puts the capital letter form of the abbreviation in the DataWindow buffer. For example, if the user enters Maine, Maine will display and ME will be put in the DataWindow.

TABLE 8

A Code Table

| Display Values | Data Values |
| --- | --- |
| Connecticut | CT |
| Connecticut | ct |
| Maine | ME |
| Maine | me |
| Massachusetts | MA |
| Massachusetts | ma |
| New Hampshire | NH |
| New Hampshire | nh |
| Rhode Island | RI |
| Rhode Island | ri |
| Vermont | VM |
| Vermont | vm |

When data is read from the database or a script into a DataWindows 24 column with a code table, and the read data matches a data value, the corresponding display value is displayed. If there is no match, the actual value displays. In this example, if the data is "MA" the corresponding display value, "Massachusetts," displays and if the data is "Mass", there is no match so "Mass" will display.

For user-entered data, processing begins at the top of the Display Value column. If the data matches a display value, the corresponding data value is put in the DataWindow 24. If there is no match and the Validate Using Code Table check box is checked, an ItemError event is triggered. If the Validate Using Code Table check box is not checked, the entered value is validated using the column's validation rule, if any, and put in the DataWindow 24.

Code tables can also be modified and queried at runtime by using the SetValue, ClearValue, and GetValue functions in a script.

A column can be made invisible. A user can neither read nor modify the data of an invisible column. Most data display objects have a "Hide" function to make the column invisible. The DataWindow painter presents this to an applications programmer through the "visible" check box, 270 e.g. of FIG. 19.

A computed column may appear in any area of a DataWindow. When a computed column has been created in the DataWindow Painter, the value of the column is calculated in the DataWindow as data is retrieved and changes as the data in the DataWindow 24 changes. The DataWindow painter has a "computed column definition" sub-painter window, which allows the applications programmer to select functions (for instance abs, avg, bitmap, ceiling, char, cos, count, etc.), operators, symbols, and style.

Figure 27:
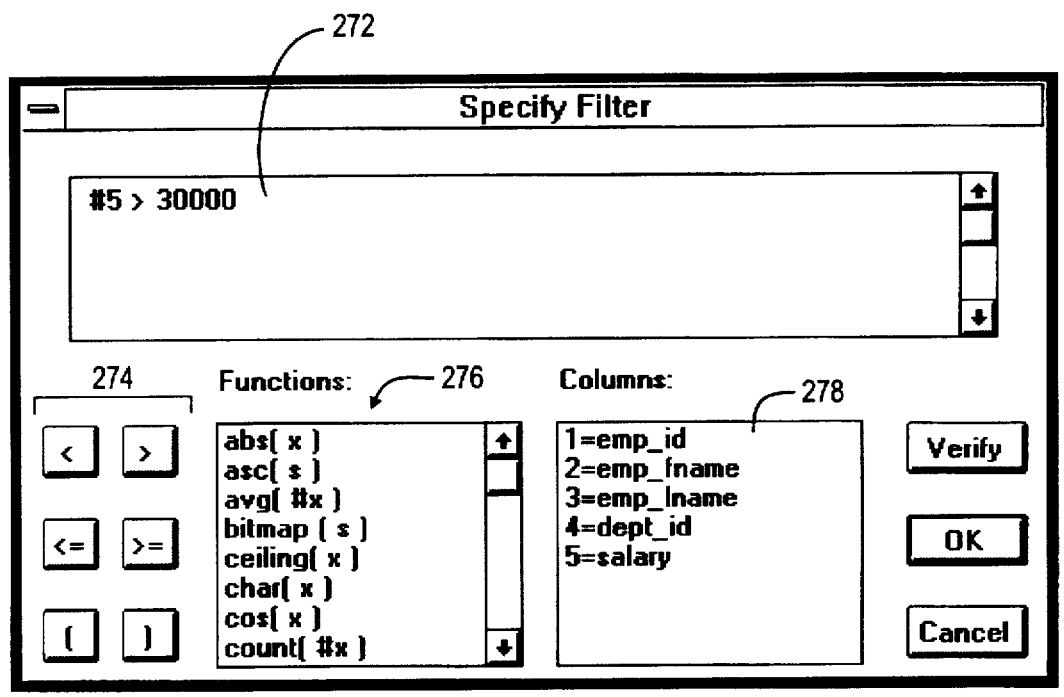

Referring to FIG. 27, as the applications programmer edits the SQL SELECT statement, he can use the WHERE and HAVING clauses and retrieve arguments in the SQL SELECT statement for the DataWindow 24 to limit the data that is retrieved from the database. This reduces retrieval time and runtime space requirements. But the DataWindow painter also provides a "filter" feature to allow the applications programmer to further limit or change the data that displays in the DataWindow by using functions (for example, the IF function) that are not valid in the SELECT statement. To define a filter, the applications programmer clicks on "Filter" in the DataWindow Painter workspace, and then the Specify Filter window of FIG. 27. The applications programmer may then enter text in the filter definition box 272 and insert the operators 274, symbols, functions 276 and column numbers 278 where appropriate. PowerBuilder automatically verifies that the syntax of the filter expression is valid.

Figure 28:
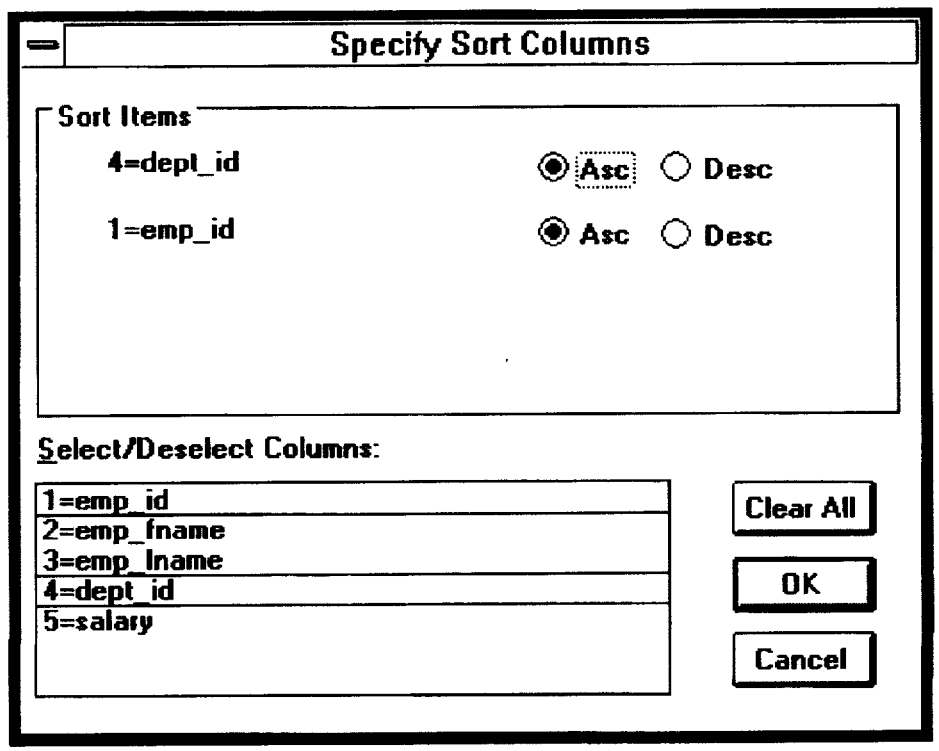
Figure 29:
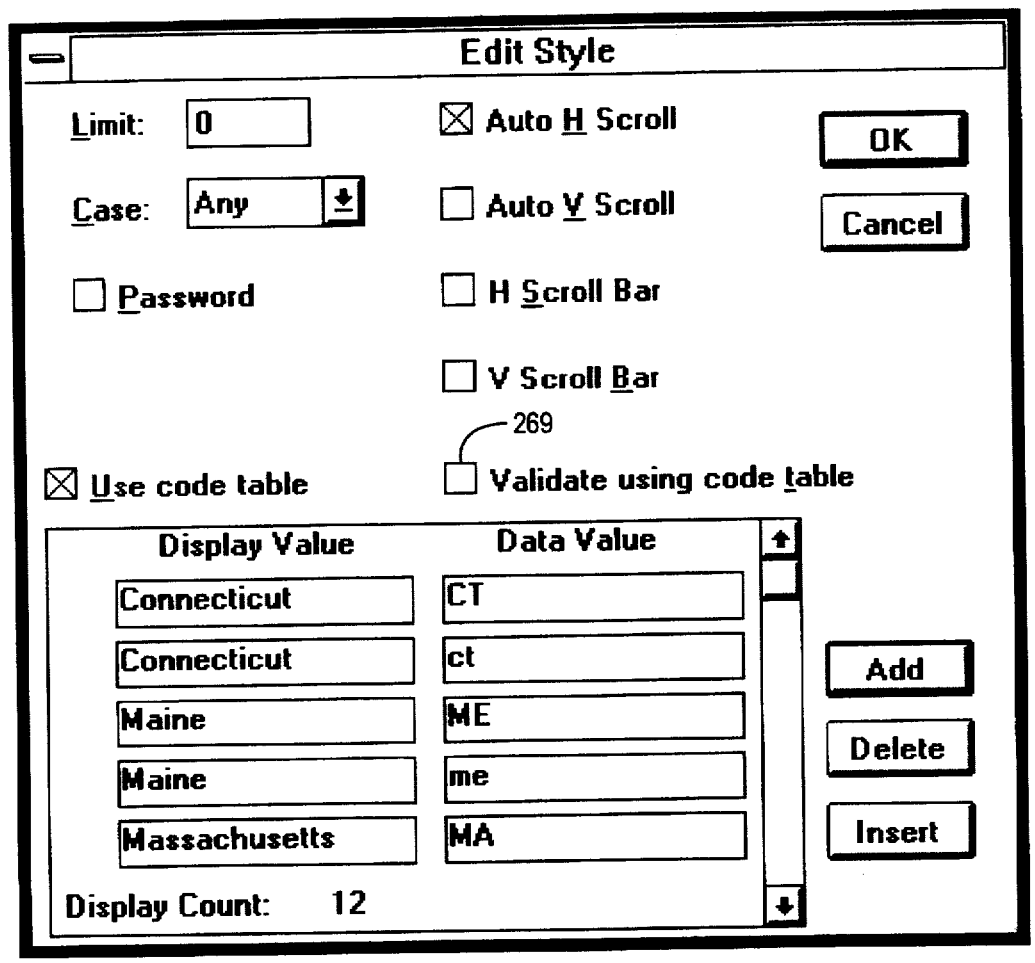
Figure 30:
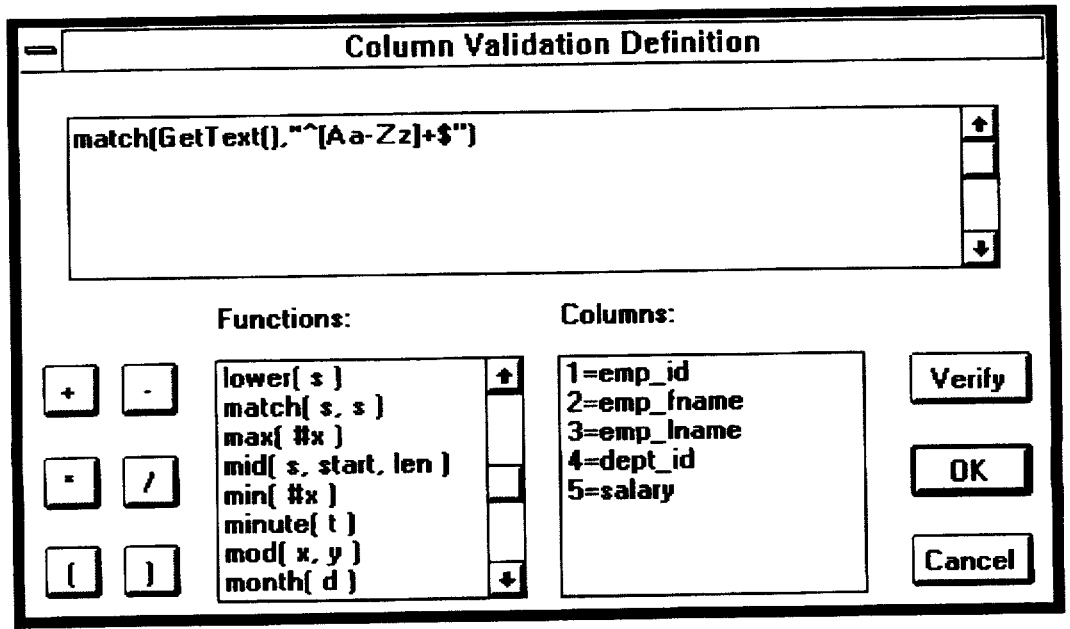

Referring to FIG. 28, the applications programmer may specify that the rows of a DataWindow are to be displayed in ascending or descending sort order. To specify the sort order for a column, the applications programmer clicks on "Sort" in the DataWindow Painter menu. The Sort window lists each column selected for the DataWindow and its position number in the DataWindow. The applications programmer can select the columns in which to sort, and specify the sort order.

Embedding the DataWindow in an Application-Scripts and Events

Referring again to FIG. 9, scripts 30 for events in window objects determine how the objects behave; the action that will be initiated when an event occurs in the object. Scripts for an object can refer to windows, MenuItems, and other window objects. Each of the Window Object types, e.g. window, RadioButton, CheckBox, and MultiLineEdit, have functions (or methods) that can be invoked by a PowerBuilder script. Window related functions are functions that cause an event in a window, manipulate or change a window, or provide information about a window. For instance, MultiLineEdit provides Clear, Copy, Cut, Move, Paste, ReplaceText, and Undo functions that can be called from a PowerBuilder script.

Some window objects, e.g. StaticText, display data from the database, but a user cannot modify the displayed text.

Once the applications programmer has defined the DataWindow 24, including its data source definition 14 and presentation style definition 16 as described above, he or she places the DataWindow in the window 18 along with other of the objects described above. Next, the applications programmer writes scripts for the DataWindow 24 that instruct it as to what actions to perform at the occurrence of an event and how to respond to events that occur in the DataWindow 24, e.g., responses to validation errors, RetrieveStart, ItemChanged, and ItemError events. A user may then access the application database 26 through the DataWindow 24. That is, the DataWindow 24 is used to display data retrieved from the application database 26, and to manipulate that data. When the user is finished displaying and/or modifying the data in the DataWindow 24, he or she can, for example, update the data stored in the application database 26 by clicking on the UPDATE command button 20d to instruct the DataWindow 24 to apply all changes directly to the application database 100. In this way, data is retrieved from the application database 26 by database management system 100 according to the data source definition, e.g., by an SQL Select statement, and stored by the DataWindow manager 100 in data structures separate from those of the application database and of the window 18 in which DataWindow 24 is used. A description of the data structures used by the DataWindow 24 is provided below in connection with FIGS. 6-7. First, however, a further description of object/event processing is provided.

Referring again to FIG. 1 and as noted above, the window 18, in response to various events, e.g., user-initiated mouse clicks and keyboard input, or certain database statements, executes one of a series of scripts 30a–30z. For example, when a user clicks on a command button, a Clicked event occurs and when the user modifies a field 22 in DataWindow 24, an ItemChanged event occurs. The event triggers the appropriate script 30 to initiate processing in response to the event. Each script 30 is a series of instructions 32a–32n, e.g., built-in functions some of which are shown in Table 9 below), procedural commands, and SQL database statements. For example, the script 30 for a Clicked event on a Retrieve button 20 retrieves and displays information from the application database 26 in the DataWindow 24, and the script 30 for an ItemChanged event on DataWindow 24 evaluates the data in the field and performs any necessary processing based on the modification. In addition, scripts themselves can also trigger events. For example, the script for a Clicked event on an object, might open a window and trigger an Open event. Each set of instructions 32 is defined for a particular object/event combination. Some instructions 32, e.g., UPDATE, DELETE, INSERT, and RETRIEVE, map to a separate DataWindow function 34, which modifies the data in the DataWindow 24 or causes the DataWindow 24 to transfer data between itself and the database 26 as described below.

TABLE 9

| Type | Functions |
| --- | --- |
| Object manipulation | Show, Hide, Move, Resize |
| Numeric | Max, Min, Abs, Truncate, Sqrt, Cos, Pi |
| String | Left, Mid, Upper, Trim, Fill |
| Date and Time Format | Day, DayName, DaysAfter, Today, Now |
| Dynamic Data Exchange | StartHotLink, GetRemote, SetRemote |
| Text Files | FileOpen, FileRead, FileWrite, FileClose |
| Other | Run, ShowHelp, Beep |

As shown above in Table 9, the instructions 32 include many types of functions, including functions to manipulate objects, numbers and text, to process dates and times, to handle dynamic data exchange (DDE), and to handle text file input and output. In an instruction 32, each function is followed with a series of arguments, e.g., literal strings, variables, or expressions (which can include references to other functions). Each function, when executed, returns a single value which the script may use or ignore in executing subsequent instructions.

A DataWindow may have vertical or horizontal scroll bars when the data selected for display cannot all display in the DataWindow at one time.

Figure 6:
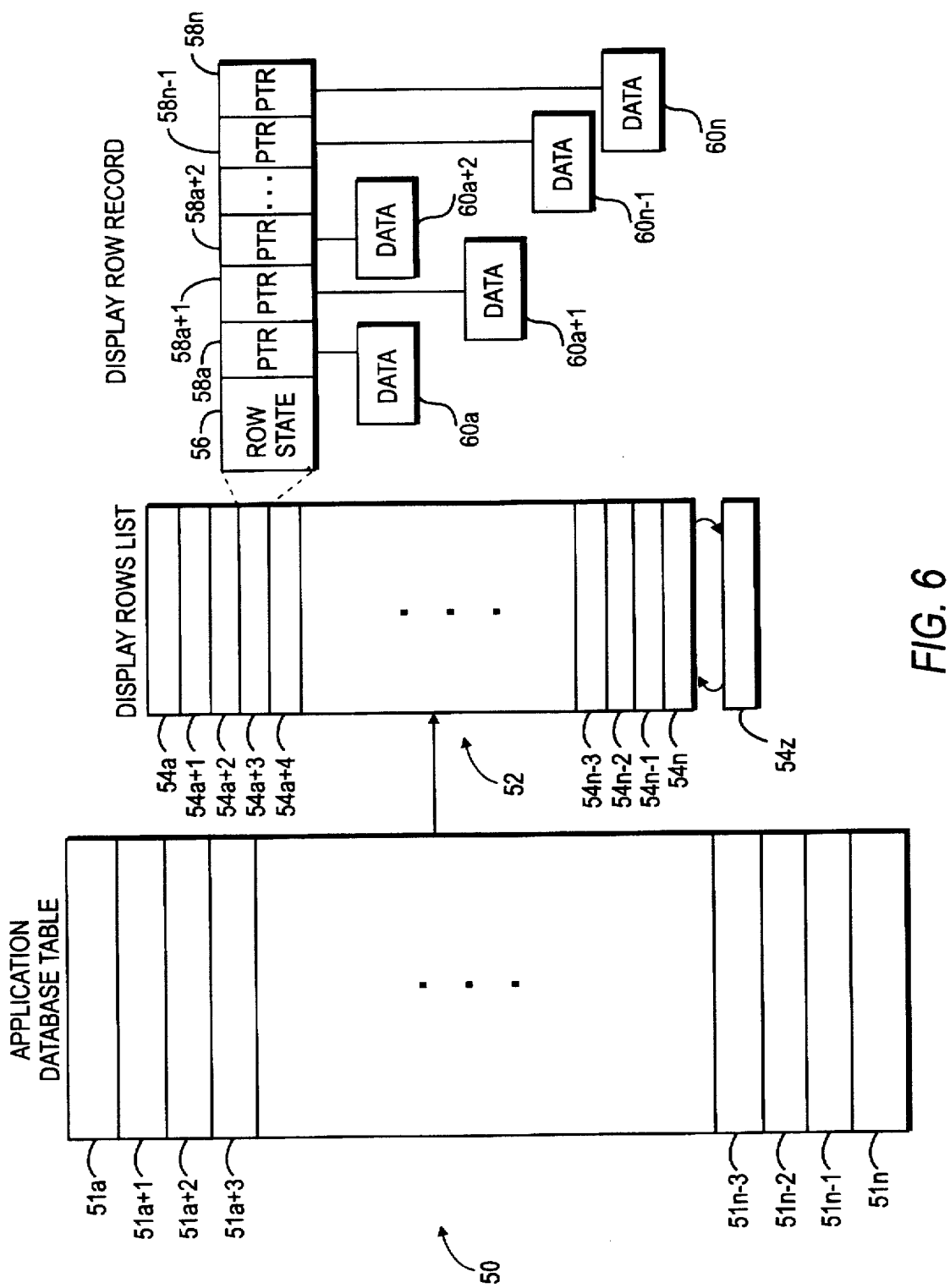
FIG. 6 is a block diagram of a row structure used by the database interface of FIG. 1 to store data taken from an application database which is to be displayed by the database interface.

Referring to FIG. 6, data structures used by the DataWindow 24 include an application database table 50 and a display rows list 52. The application database table 50 represents one file or set of data in the application database 26, e.g., employee data in the EMPLOYEE table. The table 50 contains individual data rows 51a–51n in a column format specified by the particular database being used.

Modifying the Data in the DataWindow

At the initiation of a Retrieve operation, i.e., when a user clicks on the Retrieve command button 20a (FIG. 1), all of the rows 51 that meet the requirements of the SQL SELECT statement defining the particular DataWindow 24 the user is working with are pulled from the database table 50 and inserted into the display rows list 52. The display rows list 52 contains a series of display rows 54a–54n which are broken up into columns including a row state indicator 56 and pointers 58a–58n to memory locations 60a–60n. For example, the columns 56 in a display row 54 in the EMPLOYEE table would point to relevant data 60 about one employee in a company such as an identification number, first and last name, manager's name, department, salary, and birth date. Thus, the DataWindow 24 (FIG. 1) indirectly displays and manipulates data in the database table 50 by taking some or all of the rows 51a–51n from the table 50 and inserting them into the display rows list 52.

Referring again to FIG. 6, each row 54 further includes a row state indicator 56. The state indicator 56 indicates whether a row 54 is new or modified. A new row, e.g., row 54z, is one which a user has added (via the DataWindow 24) to the display rows list 56, but which has not been "applied", i.e., added to the database table 50. Similarly, a modified row 54 is one which a user has changed somehow in the display rows list 52, but which has not been updated in the database table 50.

Figure 7:
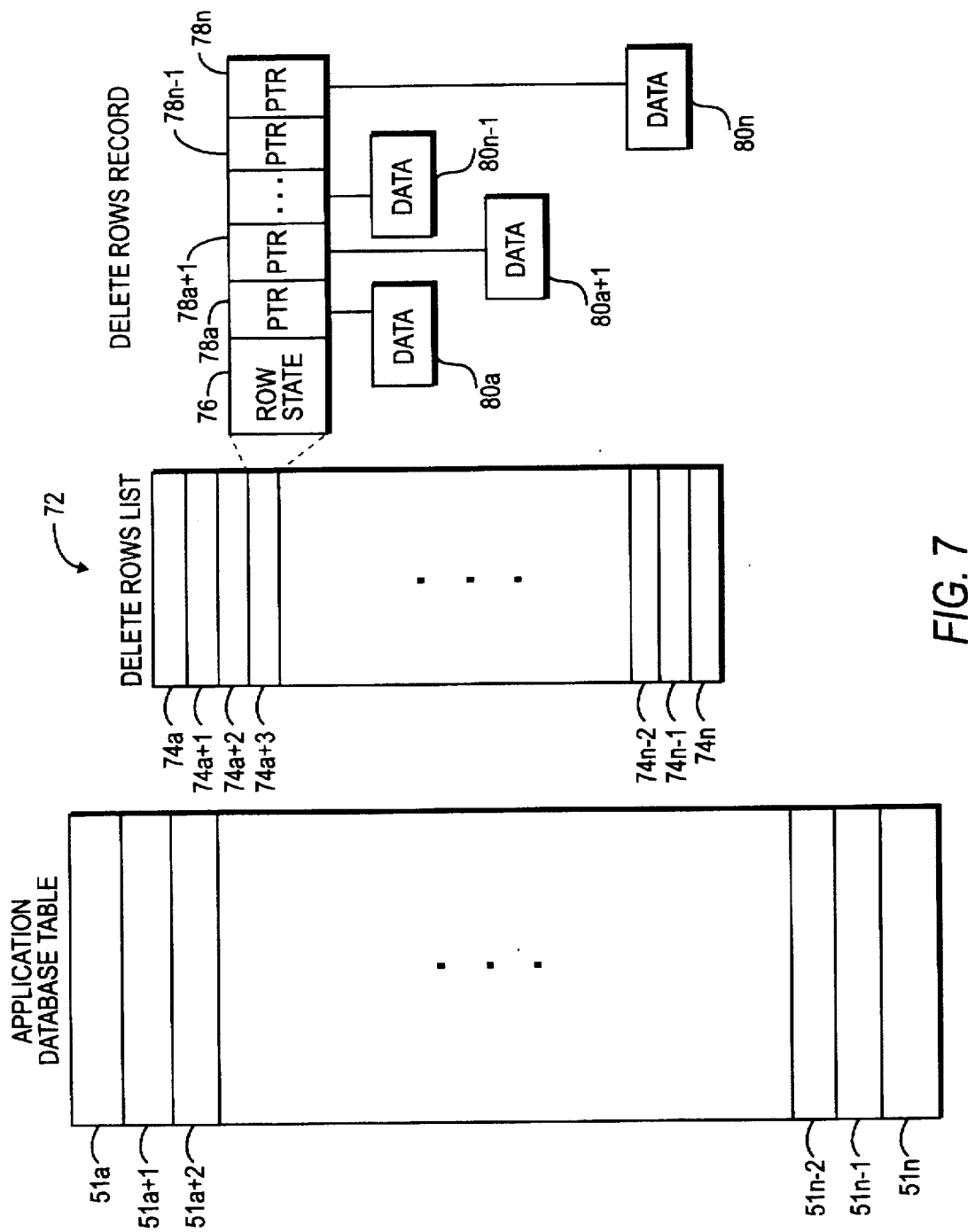
FIG. 7 is a block diagram of a row structure used by the database interface of FIG. 1 to store data deleted from the display structure of FIG. 6 and to be deleted from the application database.

Referring to FIG. 7, the data structures used by the DataWindow 24 further include a delete rows list 72 which lists all of the rows 74a–74n that a user has deleted from the display rows list 52 (FIG. 6). These deletions may be applied against the database table 50 in an update to actually remove the deleted rows from the database table 50. The delete rows list 72 contains individual data rows 74a–74n similar in format to the rows 54 in the display rows list 52. Again, the rows 74 are broken up into columns including a row state indicator 76 and pointers 78a–78n to memory locations 80a–80n that store the data of the deleted rows. Data structures similar to the display rows list 52 and delete rows list 72, are not discussed herein but which are also part of the database interface 10 and are disclosed in the attached source code appendix. These include, for example, a filter rows list which limits the data presented in the DataWindow 24, and which are also maintained by the DataWindow 24. Next, a detailed description of the operation of the database interface 10 is provided.

Several critical database operations, i.e., retrieve, insert, delete, and update, are discussed below. Other functions, e.g., modify, sort, filter, and print, are not discussed generally herein, but source code embodiments are provided in the attached appendix.

Referring now to FIGS. 1, 6, and 7, to retrieve rows from a database table 50 and display them in the DataWindow 24, the user selects the command button 20a labelled "RETRIEVE" which triggers the corresponding script 30a and causes execution of each of the instructions 32 in the script, one of which calls the RETRIEVE method 34a to direct the DataWindow 24 to retrieve data from the database table 50. To carry out the retrieve request, the DataWindow performs the operations summarized below in pseudo-code.

```
RETRIEVE FUNCTION:
    Remove all rows from Display Rows List
    Remove all rows from Delete Rows List
    Fetch rows from database into Display Rows List
    Display fetched rows
```

As indicated in the above pseudo-code statements, the DataWindow 24 first removes all rows stored in the display rows list 52 and the delete rows list 72 at the time of the selection. Then, the particular SQL Select statement defined for the DataWindow 24 is executed and the DataWindow 24 is "populated", i.e., data from the database table 50 is retrieved from the table and displayed in the DataWindow 24 according to the criteria of the data source definition 14 and the presentation style definition 16. Once the DataWindow 24 is populated, the user may browse through the displayed data to obtain the information he or she needs and, depending on what particular database functions the applications programmer has exposed for the DataWindow, may, for example, choose to add, delete, modify, sort, print, update, or otherwise manipulate the data in the DataWindow 24. Three of the most critical database functions, add, delete and update are described below.

Still referring to FIGS. 1 and 6, to add data to a DataWindow 24, i.e., insert a new row in the display rows list 52 and thereby cause the new row to appear in the DataWindow 24, the user selects the command button 20b labelled "NEW" to trigger the corresponding script 30b, which calls the INSERTROW function 34b to insert a new row 54z in the display rows list 52, which is summarized in pseudo-code below.

```
INSERT FUNCTION:
    Add row to Display Rows List;
    Flag row in Display Rows List as ROWNEW
```

Accordingly, the DataWindow 24 creates links and inserts a new row 54z to the display rows list 52. Next, with the creation of the new row 54z, the row state indicator 56 of the row 54z is set to "ROWNEW" and empty edit boxes 22 are displayed in the DataWindow 24. As the user enters data into each of the edit boxes 22, the pointers 58 of the new row 54z are set to the addresses of each of the pieces of data 60 being entered. Depending on whether the user wishes to and has privilege to update the database, the addition of the new row can be applied against, i.e., incorporated into, the actual data in the database table 50 as described below in connection with the update function. First, however, the delete function is described.

Still referring to FIGS. 1, 6 and 7, to delete a row from the display rows list 52 and thereby cause the row to be added to the delete rows list 72 and removed from the DataWindow 24, the user selects the row to be deleted, and then selects the command button 20c labelled "DELETE" which triggers the corresponding script 30c which calls the DELETEROW function 34c to delete a row 54 from the display rows 52 and add the deleted row 54 to the delete rows list 72 (see pseudo-code below).

```
DELETE FUNCTION:
    Arguments: row number
    IF  (row in Display Rows List is not ROWNEW) AND
        (row in Display Rows List is not ROWKEYMODIFIED)
    THEN
        Add row to Delete Rows List
        Remove row from Display Rows List
```

As indicated, the DataWindow 24 removes the row to be deleted 54 from the display rows list 52 and inserts it into the delete rows list 72 by known array and linked list manipulation procedures. The deletion can then be applied against the actual data in the database table 50 as described below in connection with the update function.

Still referring to FIGS. 1, 6, and 7, when the user enters data in an edit box 22 in the DataWindow 24, or edits existing data, three preconditions are checked before the new data is accepted by the DataWindow 24. These preconditions include a syntax analysis to determine whether the data input is proper for the type of column. For example, if the column is defined for numeric data only, the syntax analysis ensures that the input is a number.

The second precondition is to determine whether an ItemChanged event script exists. If so, the script is executed. The applications programmer might have defined such a script to do additional error checking as when data in a department column is changed, to determine whether the data input matches an existing department. The Item-Changed script then indicates whether the DataWindow 24 should accept the change, reject it, or prompt the user to modify his or her input.

Finally, the third precondition determines whether an ItemError script exists and whether the syntax analysis or ItemChanged script rejected the input. If there is no ItemError script and the input has been rejected, the DataWindow 24 displays a standard error message. On the other hand, if there exists an ItemError script and the input has been rejected, the ItemError script is executed to notify the user of the error. For example, the applications programmer defined error message may be displayed on the screen or the input may be corrected in some predefined way. The ItemError script then indicates whether the DataWindow 24 should accept the input, reject the input without displaying a standard error message (i.e., an error message other than the applications programmer defined error message), or reject the input and also display a standard error message.

Once all of the preconditions are met, the data is accepted by the DataWindow 24 (as summarized below in pseudo-code).

```
MODIFY COLUMN FUNCTION:
    Arguments: row number, column number, new value
    IF  (column is a key AND
         row in Display Rows List is not ROWKEYMODIFIED)
    THEN
        Add new row to Display Rows List identical to
            specified row, but including new value at
            specified column
        Add specified row to Delete Rows List
        Flag row in Display Rows List as ROWKEYMODIFIED
    ELSE
        Change Display Rows List item at specified row
            and column to the specified new value
        Flag row in Display Rows List as ROWMODIFIED
```

Referring to the pseudo-code description above, when DataWindow 24 accepts the input to be modified, the system determines the row number and column number of the data in the edit box 22 which the user has just entered or changed. Having determined the first two required arguments, the system next determines what value is now present in the edit box 22, i.e., the new value. If the modification is to a database key, e.g., changing an EMP_# from "120" to "121", and the corresponding row 54 for that key in the display rows list 52 has not already been flagged as ROWKEYMODIFIED, a new row 54z is added to the display rows list 52, the new row being identical to the row 54 specified by the row and column arguments but including the modification, i.e., the new value. Once the new row 54z is added, the old row 54 is added to the delete rows list 72, and flagged in the display rows list as ROWKEYMODIFIED.

If either of the above described conditions is not met, i.e., the modification is not to a database key or a database key in the corresponding row has already been modified, the data in the display rows list 52 at the specified row and column numbers is changed to the specified new value. For example, if an employee's last name is changed from "Smith" to "Smith-Harris", the affected column in the row 54 is EMP_LNAME. Since a last name is not a unique key column in the above example, the modification may be applied to the data in the row 54, and the row may be flagged simply ROWMODIFIED and updated accordingly as discussed below in connection with the update function.

Updating the Database

Still referring to FIGS. 1, 6, and 7, when the user wants to update the database to reflect the changes in the DataWindow 24, positions a cursor over the command button 20d labelled UPDATE and clicks on the button. This click produces an event, which triggers a corresponding script 30d, which in turn calls the UPDATE function 34d. The Update method performs the following steps (in pseudocode).

```
REQUIRED INFORMATION FOR UPDATING:
    SQL Select Statement
    Update: Table Name for Update
    Key(s): Column names of keycolumns; keys must
        uniquely identify a row
UPDATE FUNCTION:
    WHILE no database errors
        For each row in Delete ROWS List
            Generate SQL Delete syntax for row
        For each row in Display Rows List
            if (Display Rows List row is ROWNEW or
                ROWKEYMODIFIED).
                    Generate SQL insert syntax for row
            else if (Display Rows List row is
                ROWMODIFIED)
                    Generate SQL Update syntax for row
    IF (no database errors)
        Commit database changes:
    ELSE
        Rollback database changes
```

Referring to the above pseudo-code statements, the information required for updating a database table includes an SQL Select statement, e.g., "SELECT EMP_#, EMP_FNAME, EMP_LNAME, EMP_SALARY FROM EMPLOYEE", which indicates the name of the table (here, the EMPLOYEE table) and the includes at least one database key (here, EMP_#). In the example above, EMP_#, EMP_FNAME, and EMP_SALARY refer to the names of pointer columns 58 and related data 60 to be updated or inserted for each row in the database table named EMPLOYEE.

While there are no database errors, a SQL Delete statement is generated for each row 74 in the delete rows list 72. The SQL Delete statement is then executed against the data in the database table 50 to remove each of the rows 74 from the table. Next, for each of the rows 54 in the display rows list 52, if the row state indicator 56 is set to ROWNEW or ROWKEYMODIFIED, then an SQL Insert statement is generated and executed to add the data of the row 54 to the database table 50; if the row state indicator 56 is set to ROWMODIFIED then an SQL Update statement is generated and executed to modify the data of the row 54 in the database table 50. Finally, if there are no database errors, the changes to the database table 50 are committed. Otherwise, if there are database errors, the changes are "rolled back", i.e., the database is restored to its previous condition.

Updating the Database—Transaction Objects

Referring again to FIG. 9, a PowerBuilder application can access a database either by using DataWindows or by directly coding embedded SQL statements in scripts. In both cases, the database requires a valid connection prior to any access. To facilitate this, PowerBuilder provides a transaction object 300 which contains attributes that serve two purposes: (1) Provide the information required by the Database Management System (DBMS) 100 for a valid connection, and (2) Return information about the success or failure of each database statement that is executed. This connection is established using a "transaction object" 300 and the embedded SQL statements that are supported in PowerScript.

All database processing in PowerBuilder uses a special, non-graphic, object called a transaction object 300. The transaction object 300, which identifies a specific database to PowerBuilder, must be established before a DataWindow 24 can access the database. When an application begins executing, PowerBuilder creates a global default transaction object 300 named SQLCA. The applications programmer can use this transaction object or create a transaction object for the DataWindow 24 in a script. If a PowerBuilder application uses multiple databases 26 at the same time, the applications programmer must create a transaction object 300 for each database.

If the DataWindow 24 contains columns from a single database table, the DataWindow Painter by default assumes that all columns are updatable. If the DataWindow 24 contains columns from two or more database tables, the DataWindow Painter assumes by default that no columns are updatable. The DataWindow Painter allows the applications programmer to create update specifications to control updates in the DataWindow 24. These specifications: (a) Allow updates in a DataWindow 24 that is associated with multiple database tables, or prevent updates to specific columns in a DataWindow 24 that is associated with one database table. (b) Select the columns that can be updated in a table. (c) Select the key that uniquely identifies the rows in the table that will be updated. If multiple database tables are associated with the DataWindow 24, the DataWindow 24 will only allow update of one of the tables and only if the applications programmer specifies that updates are allowed for the table in the Update Specifications. To update more than one table, the SetTrans function allows a script to set the values of the DataWindow's 24 internal transaction object 300 and then use embedded SQL statements to update the table.

PowerBuilder transaction objects 300 are the communication area between PowerScript and the database manager 100 and the database 26. Each transaction object 300 has thirteen attributes; nine are used to connect to the database and four are used to receive information from the database about the success or failure of each command of database processing. The attributes are described in Table 10:

TABLE 10

Attributes of a Transaction Object

| Attribute | Data Type | Description |
|---|---|---|
| DBMS | String | The name of the database vendor. |
| Database | String | The name of the database with which the DataWindow is connecting. |
| Userid | String | The name or id of the user who will connect to the database. |
| DBPass | String | The password that will be used to connect to the database. |
| Lock | String | The isolation level |
| Logid | String | The name or id of the user who will log on to the server. |
| Logpass | String | The password that will be used to log on the server. |
| ServerName | String | The name of the server on which the database resides. |
| AutoCommit | Boolean | The automatic commit indicator: TRUE - Commit automatically after every database activity. FALSE - (default) Do not commit automatically after every database activity. |
| SQLCode | Long | The success or failure code of the most recent operation: 0 - Success 100 - Not Found -1 - Error (use SQLErrCode or SQLErrText to obtain the details) |
| SQLNRows | Long | The number of rows affected. The database vendor supplies this number and it may not have the same meaning in every DBMS. |
| SQLErrCode | Long | The database vendor's error code. |
| SQLDBText | String | The database vendor's error message. |

Before any transaction object, including the default transaction object, can be used, values must be assigned to the transaction object database information fields, using a script and the PowerScript dot notation. For example, these statements assign values to the database information fields required to connect to a Sybaset database named "testdb" in the default transaction object (sqlca):

```
//Set the default transaction object attributes
sqlca.DBMS        = "Sybase"
sqlca.database    = "testdb"
sqlca.LogID       = "RGood"
sqlca.LogPass     = "superman"
sqlca.ServerName  = "Dill"
sqlca.AutoCommit  = FALSE
SQLCA.userid      = "SYSADM"
SQLCA.dbpass      = "SYSADM"
// Connect to the database
CONNECT;
// Disconnect from the database
DISCONNECT;
```

The transaction object attributes that are used to connect to the database are different for each DBMS, and can be determined by reference to the interface manual for the specific DBMS. Informational attributes are supported in all databases.

PowerBuilder utilizes a basic concept of database transaction processing called logical unit of work (LUW). LUW is synonymous with transaction. When an application executes a database command, it always executes it within the boundaries of a transaction. There are four PowerScript transaction management statements:

COMMIT
CONNECT
DISCONNECT
ROLLBACK

A transaction is started with a successful CONNECT and is terminated with a DISCONNECT. All SQL statements that are executed between the CONNECT and the DISCONNECT occur within the transaction. When a COMMIT is executed, all changes to the database since the start of the current transaction are made permanent, and a new transaction is begun. When a ROLLBACK is executed, all changes since the start of the current transaction are undone, and a new transaction is begun. By default, when a transaction is disconnected, a COMMIT is issued. Before a PowerScript issues a CONNECT statement, the transaction object must exist and values must be assigned to all required transaction object attributes for the DBMS to which the transaction object is connecting.

Since most applications communicate only with a single database 26, PowerBuilder provides a global default transaction object named SQL Communications Area (SQLCA). This object is created before the application's open script executes and can be referenced in the script for any object by using the PowerBuilder dot notation. The applications programmer can create additional transaction objects as needed, though in most cases SQLCA is the only transaction object required.

A script 30 communicates the transaction object 300 values to the DataWindow 24 using the SetTrans or SetTransObject functions. SetTrans copies the values from a specified transaction object to the DataWindow's 24 internal transaction object.

If the script uses the SetTrans function, the DataWindow 24 has its own transaction object and automatically performs connects and disconnects as needed and any errors that occur will cause an automatic rollback.

The SetTransObject function tells the DataWindow 24 to share a transaction object in scripts. The SetTransObject function gives the applications programmer more control of the database processing—he assumes responsibility for managing the database processing. A script that uses the SetTransObject function should code the following statements:

CONNECT
SetTransObject
Retrieve or Update
COMMIT or ROLLBACK
DISCONNECT

These statements set the transaction object EmpSQL, which was created and assigned values previously, as the transaction object to be used by the DataWindow 24 dw_emp:

```
//Connect to the database specified in the
//transaction object EmpSQL.
CONNECT Using EmpSQL;
//Set the transaction object for dw_Emp
//to be used by EmpSQL.
SetTransObject (dw_Emp, EmpSQL)
Retrieve(dw_emp)    //Causes dw_Emp to retrieve data
```

```
                    //from the specified database.
●   //Perform some database processing
●
●
●
If Update(dw_emp) > 0 then
        //Update dw_Emp
        Commit Using EmpSQL;
Else
        ROLLBACK Using EmpSQL;
End if
DISCONNECT ;
```

An actual script would include error tests after the CONNECT, INSERT, DELETE, and DISCONNECT. To carry out operations in more than one database at the same time, a PowerScript must use multiple transaction objects, one for each database connection. The script must declare and create the additional transaction objects before referencing them and must destroy these transaction objects when they are no longer needed.

After the applications programmer has created and saved the DataWindow 24, he can place it in a window, initialize its internal transaction object, and if necessary write the scripts to control the database and window processing that will be initiated when events occur in the DataWindow 24. After the DataWindow 24 is placed in a window in the Window painter, the applications programmer can move the DataWindow 24, size it, define a style for it, and refer to it in scripts, using the Window Painter.

Reading and Writing Other Data Sources and Destinations

The SaveAs function allows the data contents of a DataWindow 24 to be saved in a file other than a database table. The SaveAs function takes as its arguments the name of the DataWindow 24 whose contents are to be saved, the name of the destination file, and a value from an enumerated type that specifies the save format: comma- or tabseparated values, Windows clipboard, dBase-II format, dBaseIII format, DIF, (Data Interchange Format), Microsoft Excel format, SQL Insert statements, Microsoft Multiplan format, or Lotus 1-2-3 format. The SaveAs function can optionally include column headings.

The ImportClipboard function copies the contents of the clipboard (between specified start and end columns and start and end rows) into a DataWindow 24 at a specified start column.

The ImportFile function copies the contents of a named file (the contents of the file limited by a specified start and end row number and a specified start and end column number) into a DataWindow 24. The file must be a text file.

The ImportString function copies the contents of a string (between specified start and end columns and start and end rows) into a DataWindow 24 at a specified start column.

Test, Debug, and Regular Modes

The DataWindow Painter test feature allows the applications programmer to view the DataWindow 24 as it will appear to the user and to test the processing that takes place in the DataWindow 24. To open the Test window, the applications programmer can select "Test" from the Design Menu. The Test window of the DataWindow Painter shows the information specified for header and footer areas of the DataWindow 24. However, no information displays in the body of the DataWindow 24 until data are retrieved or a row is added to the DataWindow 24.

The Test window allows the applications programmer to test several functions of the DataWindow 24, including modifying data, retrieve and display database data in the DataWindow 24 (equivalent to calling the Retrieve function), add new rows (equivalent to calling the InsertRow function and then the ScrollToRow function), update the database with changes made in the DataWindow 24 (equivalent to calling the Update function), delete rows from the DataWindow 24 (equivalent to calling the DeleteRow function), move to the Next or Prior row (equivalent to calling the ScrollNextRow or ScrollPriorRow function), define and test filters and sort criteria, and print the contents of the DataWindow 24 as they display in the Test window.

After the applications programmer has built all or part of an application and saved it in a library, he can run the application in either debug mode or regular run mode, by selecting a mode from the DataWindow object's 124 File menu. In debug mode, the applications programmer can insert breakpoints in scripts, single step through a script, and display the contents of variables. In regular mode, the application responds to user interaction and runs until the user stops it.

Other embodiments are within the following claims.

---

APPENDIX A
Data Source Definiton and Presentation Style Definition

```
test_employe source-1-
release 1;
dw.lw: aWindow;
dw.hr: aRegion(dw.lw. 0,0,0,(-73),1,0,73,1);
dw.ar: aRegion(dw.lw, 0,0,0,0,1,1,3,3);
dw.fr: aRegion(dw.lw, 0,0,(1),0,1,0,0,4);
dw.dr: aRegion(dw.lw, 0,0,73,0,1,1,79,2);
dw.fdr: aRegion(dw.lw, 0,0,73,0,0,1,79,2);
dw.in: table
'col1' as double,
'col2' as double,
'col3' as text(20),
'col4' as text(20),
'col5' as double,
'col6' as double,
'col7' as datetime$ from
'SELECT employee.emp_id, employee.manager_id, employee.emp_fname, employee.emp_lname,
employee.dept_id, employee.salary, employee.birth_date FROM employee'
```

APPENDIX A
Data Source Definiton and Presentation Style Definition

```
update 'employee'
using '(u) employee.emp_id',
'(u)employee.manager_id',
'(u)employee.emp_fname',
'(u)employee.emp_lname',
'(u)employee.dept_id',
'(u)employee.salary',
'(u)employee.birth_date'
key 'emp_id';
sort dw.in by dw.in.col1;
dw.pn: aPen;
dw.br: aBrush;
dw.bk: aBkgrnd;
dw.fn: aFont:
dw.col: dTable(dw. 1w, dw.dr, dw.fdr, dw.in, dw.pn, dw.br, dw.bk, dw.fn, 2);
dw.fn0: aFont;
dw.fn0.face = 'Helv';
dw.fn0.height = 53;
dw.fn0.weight = 700;
dw.fn0.family = 2;
dw.fn0.pitch = 2;
dw.fn0.charset = (0);
dw.fn0.pitch = 2;
dw.bk1: aBkgrnd;
dw.bk1.mode = 1;
dw.bk1.color = 536870912;
dw.col.col1.width = 288;
dw.col.col1.height = 68;
dw.col.col1.font = dw.fn0;
dw.col.col1.bk = dw.bk1;
dw.col.col1.x = 10;
dw.col.col1.y = 7;
dw.col.col1.editstyle = 2049;
dw.col.col1.alignment =0;
dw.col.col1.tabseq = 10:
dw.col.col2.width = 288;
dw.col.col2.height = 68;
dw.col.col2.font = dw.fn0;
dw.col.col2.bk = dw.bk1;
dw.col.col2.x = 307;
dw.col.col2.y = 7;
dw.col.col2.editstyle = 2049;
dw.col.col2.alignment = 0;
dw.col.col2.tabseq = 20;
dw.col.col3.width = 640;
dw.col.col3.height = 68;
dw.col.col3.font = dw.fn0;
dw.col.col3.bk = dw.bk1;
dw.col.col3.x = 668;
dw.col.col3.y = 7;
dw.col.col3.editstyle = 1312769;
dw.col.col3.alignment = 0;
dw.col.col3.tabseq = 30;
dw.col.col3.width = 640;
dw.col.col4.height = 68;
dw.col.col4.font = dw.fn0;
dw.col.col4.bk = dw.bk1;
dw.col.col4.x = 1317;
dw.col.col4.y = 7;
dw.col.col4.editstyle = 1312769;
dw.col.col4.alignment = 0;
dw.col.col4.tabseq = 40;
dw.col.col5.width = 288;
dw.col.col5.height = 68;
test_employee source -2-
dw.col.col5.font = dw.fn0,
dw.col.col5.bk = dw.bk1,
dw.col.col5.x = 1966;
dw.col.col5.y = 7;
dw.col.col5.editstyle = 2049,
dw.col.col5.alignment = 0;
dw.col.col5.tabseq = 50;
dw.col.col6.width = 334;
dw.col.col6.height = 68:
dw.col.col6.font = dw.fn0;
dw.col.col6.bk = dw.bk1;
dw.col.co 6.x = 2268:
```

APPENDIX A
Data Source Definiton and Presentation Style Definition

```
dw.col.col6.y = 7;
dw.col.col6.editstyle = 2049;
dw.col.col6.format = '$#,##0.00;(RED)($#,##0.00)';
dw.col.col6.alignment = 0;
dw.col.col6.tabseq = 60;
dw.col.col7.width = 608;
dw.col.col7.height = 68;
dw.col.col7.font = dw.fn0;
dw.col.col7.bk = dw.bk1;
dw.col.col7.x = 2615;
dw.col.col7.y = 3;
dw.col.col7.editstyle = 2049;
dw.col.col7.format = 'mm/dd/yy';
dw.col.col7.alignment = 0;
dw.col.col7.tabseq = 70;
dw.fn2; aFont;
dw.fn2.face = 'Helv';
dw.fn2.height = 53;
dw.fn2.weight = 700;
dw.fn2.family = 2;
dw.fn2.pitch = 2;
dw.fn2.charset = (0);
dw.fn2.underline = 1;
dw.fn2.pitch = 2;
dTestRect(dw.1w, dw.hr, dw.fn2, dw.bk1, 3, 255, 2, 0, 10, 5, 69, 57, 'Id');
dTestRect(dw.1w, dw.hr, dw.fn2, dw.bk1, 4, 255, 2, 0, 307, 5, 563, 57, 'Manager');
dTestRect(dw.1w, dw.hr, dw.fn2, dw.bk1, 5, 255, 2, 0, 668, 5, 988, 57, 'First Name');
dTestRect(dw.1w, dw.hr, dw.fn2, dw.bk1, 6, 255, 2, 0, 1317, 5, 1633, 57, 'Last Name');
dTestRect(dw.1w, dw.hr, dw.fn2, dw.bk1, 7, 255, 2, 0, 1966, 5, 2199, 57, 'Dept ID');
dTestRect(dw.1w, dw.hr, dw.fn2, dw.bk1, 8, 255, 2, 0, 2337, 5, 2524, 57, 'Salary');
dTestRect(dw.1w, dw.hr, dw.fn2, dw.bk1, 9, 255, 2, 0, 2629, 5, 2935, 57, 'Birth Date');
true
```

I claim:

1. A database interface to an application database table containing data elements to be presented to a user via said database interface, the interface executable by a computer and comprising:

a data window object tailored, without access to source code of said data window object to said database table by defining:

a plurality of visual presentation attributes that determine a display manner of a data window for display of data elements of said database table, and data definition attributes that define both type and value validity criteria of said data elements, said data window object comprising means for indirectly manipulating said data elements by:

retrieving said data elements from said application database table into a memory buffer and presenting said data elements in said defined display manner;

receiving from a user of said interface commands for altering the retrieved data elements in said memory buffer; and automatically generating database statements to apply results of said indirect manipulation from said data elements in said memory buffer to said application database table.

2. The database interface of claim 1 wherein said defining of visual presentation attributes is performed by means of a graphical window painter.

3. The database interface of claim 1, wherein said value validity criteria are specified as part of said tailoring in the form of a boolean expression.

4. The database interface of claim 3, wherein said boolean expression includes a term referencing data of a column of said database table.

5. The database interface of claim 3, wherein said boolean expression includes a string pattern match.

6. The database interface of claim 1, wherein said value validity criteria are specified as part of said tailoring in the form of an enumerated list of allowable values.

7. The database interface of claim 1, further comprising a menu of said value validity criteria specified part of said tailoring, and associated as a further part of said tailoring with columns of said database table.

* * * * *